(12) United States Patent
McClary et al.

(10) Patent No.: US 6,950,446 B2
(45) Date of Patent: *Sep. 27, 2005

(54) METHOD AND APPARATUS FOR SIMULTANEOUSLY SYNC HUNTING SIGNALS

(75) Inventors: Michael McClary, Newark, CA (US); Sharath Narahari, Pleasanton, CA (US); Andrew Tao, Palo Alto, CA (US)

(73) Assignee: Redback Networks Inc., San Jose, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 09/835,979

(22) Filed: Apr. 16, 2001

(65) Prior Publication Data

US 2003/0023668 A1 Jan. 30, 2003

Related U.S. Application Data

(60) Provisional application No. 60/280,694, filed on Mar. 31, 2001.

(51) Int. Cl.$^7$ .................................................. H04J 3/06
(52) U.S. Cl. ..................... 370/503; 370/542; 370/470; 370/386
(58) Field of Search .............................. 370/503, 507, 370/709, 510, 512, 513, 514, 535, 536, 537, 538, 539, 540, 363, 419, 386, 401, 542, 470, 465, 466, 467, 476, 509

(56) References Cited

U.S. PATENT DOCUMENTS

| | | | | |
|---|---|---|---|---|
| 4,667,324 A | | 5/1987 | Graves ........................ 370/538 |
| 4,796,256 A | * | 1/1989 | Opderbeck et al. ......... 370/294 |
| 4,910,754 A | * | 3/1990 | Allen et al. ................. 375/357 |
| 5,161,152 A | * | 11/1992 | Czerwiec et al. ........... 370/463 |
| 5,400,369 A | * | 3/1995 | Ikemura ...................... 375/368 |
| 5,500,853 A | * | 3/1996 | Engdahl et al. ............. 370/252 |
| 5,511,077 A | | 4/1996 | Shimada ...................... 370/505 |
| 5,519,700 A | | 5/1996 | Punj ............................ 370/419 |
| 5,526,359 A | * | 6/1996 | Read et al. .................. 370/516 |
| 5,533,018 A | | 7/1996 | DeJager et al. ........... 370/395.5 |
| 5,550,820 A | | 8/1996 | Baran ....................... 370/395.5 |
| 5,615,237 A | * | 3/1997 | Chang et al. ............... 375/368 |
| 5,621,773 A | | 4/1997 | Varma et al. ............... 375/368 |
| 5,668,807 A | * | 9/1997 | Shachar et al. ............. 370/378 |
| 5,825,770 A | | 10/1998 | Coady et al. ................ 370/378 |
| 5,835,165 A | * | 11/1998 | Keate et al. ........... 375/240.27 |
| 5,963,564 A | * | 10/1999 | Petersen et al. ............. 370/503 |
| 6,038,226 A | | 3/2000 | Ellersick et al. ............ 370/352 |

(Continued)

FOREIGN PATENT DOCUMENTS

| | | |
|---|---|---|
| WO | PCT/US01/50087 | 6/2002 |
| WO | PCT/US02/05088 | 6/2002 |
| WO | PCT/US02/04451 | 7/2002 |
| WO | PCT/US02/04603 | 7/2002 |
| WO | PCT/US02/11451 | 9/2003 |

OTHER PUBLICATIONS

S. Keshav, An Engineering Approach to Computer Networking ATM Networks, the Internet, and the Telephone Network, pp. 15, 16, and 498–502, Addison–Wesley Professional Computing Series.
PCT Int'l Search Report Publication Date Apr. 12, 2002.

*Primary Examiner*—Brian Nguyen
(74) *Attorney, Agent, or Firm*—Blakely, Sokoloff, Taylor & Zafman LLP

(57) ABSTRACT

A method and apparatus for simultaneously sync hunting signals is described. In one embodiment of the invention, a computer implemented method comprises initializing a first and second subset of a set of per-alignment state machines, receiving a first and second signal, and simultaneously sync hunting the first signal with the first subset of the set of per-alignment state machines and the second signal with the second subset of the set of per-alignment state machines.

6 Claims, 23 Drawing Sheets

U.S. PATENT DOCUMENTS

| | | | | |
|---|---|---|---|---|
| 6,058,119 A | * | 5/2000 | Engbersen et al. | 370/466 |
| 6,075,788 A | | 6/2000 | Vogel | 370/395.51 |
| 6,160,806 A | * | 12/2000 | Cantwell et al. | 370/360 |
| 6,185,424 B1 | | 2/2001 | Pon et al. | 455/445 |
| 6,198,751 B1 | | 3/2001 | Dorsey et al. | 370/466 |
| 6,237,029 B1 | | 5/2001 | Master et al. | 709/217 |
| 6,272,144 B1 | | 8/2001 | Berenbaum et al. | 370/419 |
| 6,389,013 B1 | * | 5/2002 | Doss et al. | 370/225 |
| 6,385,209 B1 | | 6/2002 | Skirmont et al. | 370/419 |
| 2001/0033580 A1 | | 10/2001 | Dorsey et al. | 370/466 |
| 2002/0018468 A1 | | 2/2002 | Nishihara | 370/389 |

* cited by examiner

| SM 48 | SM 98 | SM 146 |
|---|---|---|
| . | . | . |
| . | . | . |
| . | . | . |
| . | . | . |
| SM 1 | SM 50 | SM 99 |
| SM 0 | SM 49 | SM 98 |

METHOD AND APPARATUS FOR SIMULTANEOUSLY SYNC HUNTING SIGNALS

NOTICE OF RELATED APPLICATION

This is a continuation of U.S. Provisional Application No. 60/280,694, entitled "A Method and Apparatus for Processing Multiple Communications Signals in One Clock Domain", filed Mar. 31, 2001.

BACKGROUND OF THE INVENTION

1. Field of the Invention

The invention relates to communication networks. More specifically, the invention relates to processing bit streams.

2. Description of the Related Art

A digital transmission line that uses wire-pair and coaxial cable is known as a T-carrier. T-carriers include T1 and T3 lines. A T1 line is a point to point digital communications circuit that carries 24 64 kbits/s channels ("Digital Hierarchy-Formats Specification", American National Standards for Telecommunications, ANSI T1.107, 1995). The bits on the T1 circuit are sent as frames. Each frame consists of 24 8 bit channels resulting in 192 bits per frame ("Digital Hierarchy-Formats Specification", American National Standards for Telecommunications, ANSI T1.107, 1995). The frames are sent at a rate of 8,000 frames per second ("Digital Hierarchy-Formats Specification", American National Standards for Telecommunications, ANSI T1.107, 1995). This transfer rate provides an aggregate payload data rate of approximately 1.544 Mbits/s ("Digital Hierarchy-Formats Specification", American National Standards for Telecommunications, ANSI T1.107, 1995). A framing bit for synchronization increases the size of each frame to 193 bits. The framing bit cycles through a framing bit pattern. A receiver searches for this framing bit pattern to achieve synchronization of the bit stream it is receiving. This bit format is referred to as digital signal level 1 (DS1).

A T-3 line is a digital transmission circuit that supports 28 T1 lines. The bit rate for a T1 line is approximately 44.736 Mbits/s. The bit format of the bit streams carried over T3 lines is referred to as digital signal level 3 (DS3). DS1 signals are multiplexed into DS3 signals. The multiplexing process is a 2 step process ("The Fundamentals of DS3", 1992). Four DS1 signals are bit by bit interleaved to form a DS2 signal. Seven DS2 signals are multiplexed to form a DS3 signal.

FIG. 1 (Prior Art) is a diagram of a DSn deframer. A DS3 bit stream 101 and a clock signal 103 enter a line interface unit 105. The line interface unit 105 feeds the bit stream 101, clock signal 103, and a valid bit stream 107 into a DS3 deframer 102. The DS3 deframer 102 sync hunts the bit stream received from the line interface unit 105. Each of the seven DS2 subchannels (a signal bit stream 113 and subchannel bit stream 115) carried in the DS3 signal 101 is fed into individual DS2 deframers 106. Individual clocks are generated for each DS2 deframer with the DS2 clock rate. From each of the DS2 deframers 106, a bit stream 117 and a subchannel bit stream 119 is fed into four DS1 deframers 110, for a total of twenty-eight DS1 deframers 110. A clock for each of these DS1 deframers is generated with a DS1 clock rate. Hence, a total of 36 clocks (1 DS3 clock+7 DS2 clocks+28 DS1 clocks) are generated to deframe a single DS3 bit stream. A deframed bit stream 121 is sent to a destination external to the DSn deframer from each of the DS1 deframers 110.

Deframing more than one DS3 bit stream requires a network element with a 1:1 relationship of DSn deframers to DS3 bit streams. Alternatively, a DSn deframer with a 1:n relationship to DS3 bit streams becomes increasingly complicated and costly since the number of deframers and clocks increase linearly with the number of DS3 bit streams to be processed.

SUMMARY OF THE INVENTION

A method and apparatus for simultaneously sync hunting signals is described. According to one embodiment of the invention, a method is provided for initializing a first and second subset of a set of per-alignment state machines and receiving a first and second signal, and simultaneously sync hunting the first signal with the first subset of the set of per-alignment state machines and the second signal with the second subset of the set of per-alignment state machines.

These and other aspects of the invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth to provide a thorough understanding of the invention. However, it is understood that the invention may be practiced without these specific details. In other instances, well-known protocols, structures and techniques have not been shown in detail in order not to obscure the invention. Although the invention has been described with respect to DS3, DS2 and DS1 signals, the invention can also be applied to other signaling formats including E3, E2, E1, J1, etc.

Figure 1:
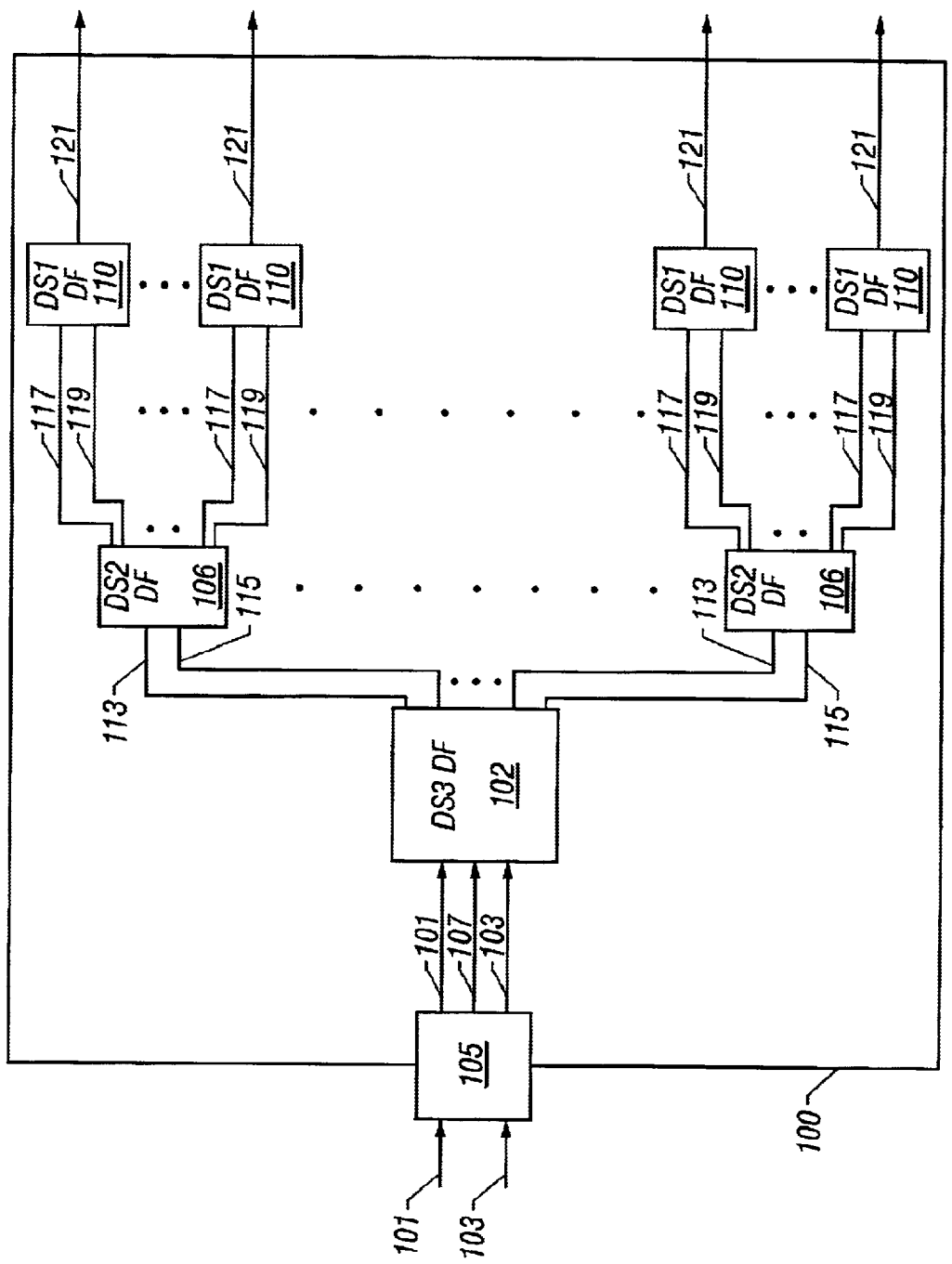
FIG. 1 (Prior Art) is a diagram of a DSn deframer.
Figure 2:
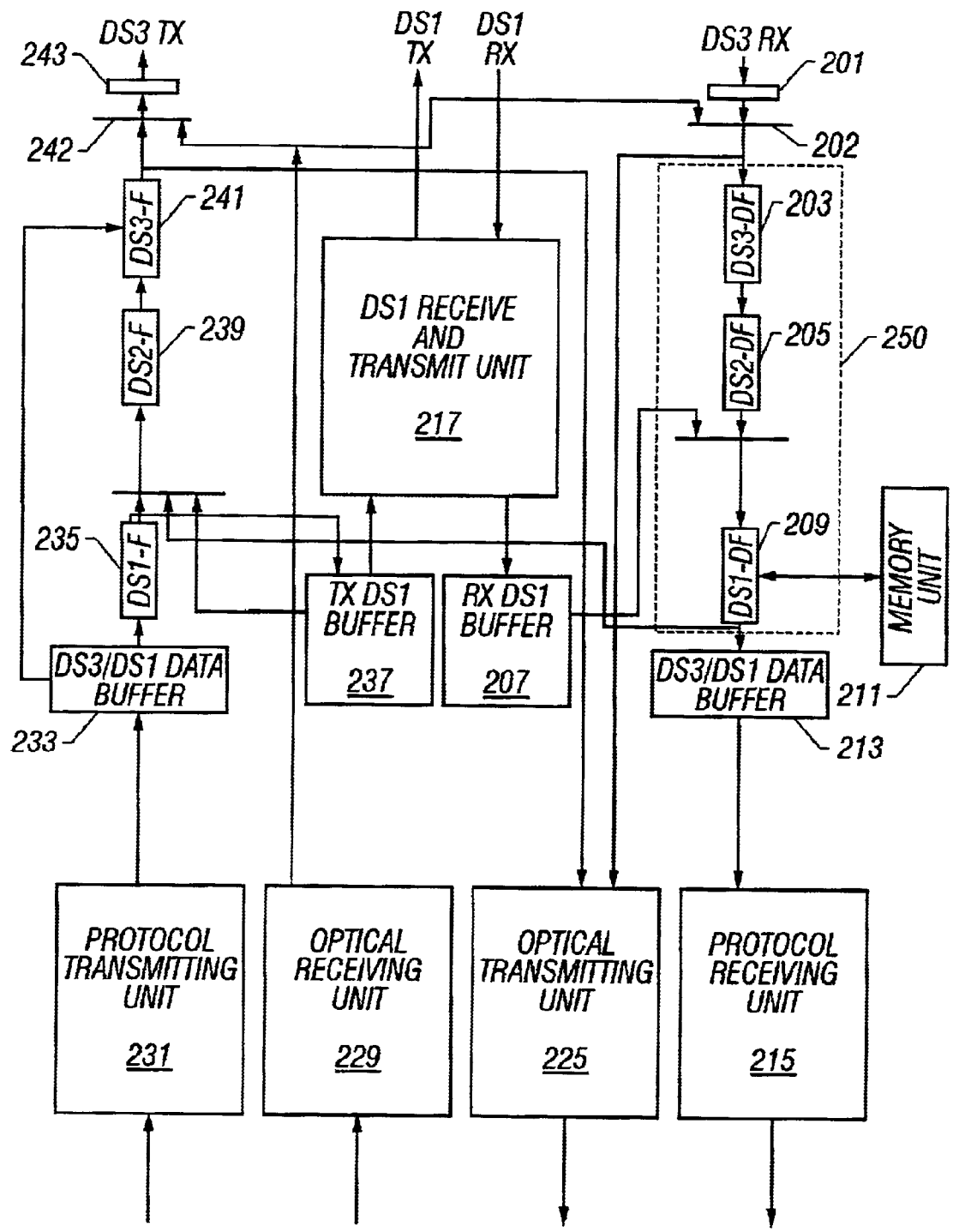
FIG. 2 is a diagram of units of a network element according to one embodiment of the invention.

FIG. 2 is a diagram of units of a network element according to one embodiment of the invention. In FIG. 2, a receiving unit 201 receives multiple DS3 signals. The DS3 signals can loop to a transmit buffering unit 242. The receiving unit 201 is also connected to an optical transmitting unit 225 and a receive buffering unit 202. The receive buffering unit 202 is connected to a DSn deframing block 250. The optical transmitting unit 225 processes the DS3 signals from the receiving unit 201 for optical transmission (e.g., mapping the DS3 signals to STS formatting).

The DSn deframing block 250 includes a DS3 deframing unit 203, a DS2 deframing unit 205, and a DS1 deframing unit 209. Some signals that flow into the DSn deframing block 250 enter the DS3 deframing unit 203. The DS3 deframing unit 203 is connected to the DS2 deframing unit 205. The DS2 deframing unit 205 connects to the DS1 deframing unit 209.

DS1 formatted bit streams are received at the DS1 receive and transfer unit 217 of the network element. In one embodiment of the invention, the DS1 bit streams are received from T1 lines (not shown) that are connected to the DS1 receive and transmit unit 217. DS1 signals can be carried in a number of ways including as SONET payload, microwave, etc. The DS1 receive and transmit unit 217 connects to a receiving DS1 buffer 207 and a transmitting DS1 buffer 237. The receiving DS1 buffer 207 is coupled to the DS1 deframing unit 209. DS1 signals received at the DS1 receive and transmit unit 217 follow a path to the DS1 deframing unit 209 via the receiving DS1 buffer 207.

The DS1 deframing unit 209 is coupled to an external memory unit 211. The DS1 deframing unit 209 is also coupled to a DS2 framing unit 239 and a DS3/DS1 data buffer 213. The DS3/DS1 data buffer 213 is coupled to a protocol receiving unit 215.

A protocol transmitting unit 231 is connected to a DS3/DS1 data buffer 233. The protocol transmitting unit 231 performs various functions such as protocol encapsulation. The data buffer 233 is connected to a DS3 framing unit 241 and a DS1 framing unit 235. The DS1 framing unit 235 connects to the transmitting DS1 buffer 237. Bit streams framed by the DS1 framing unit 235 follow a path to the DS1 receive and transmit unit 217 via the transmitting DS1 buffer 237. The DS1 framing unit 235 also connects to the DS2 framing unit 239. The DS2 framing unit 239 connects to the DS3 framing unit 241. The DS3 framing unit 241 is coupled to the transmit buffering unit 242 and the optical transmitting unit 225.

An optical receiving unit 229 connects to the transmit buffering unit 242. The optical receiving unit 229 performs various functions such as demapping STS formatted signals into DS3 signals. The optical receiving unit 229 also connects to the receive buffering unit 202.

Figure 3:
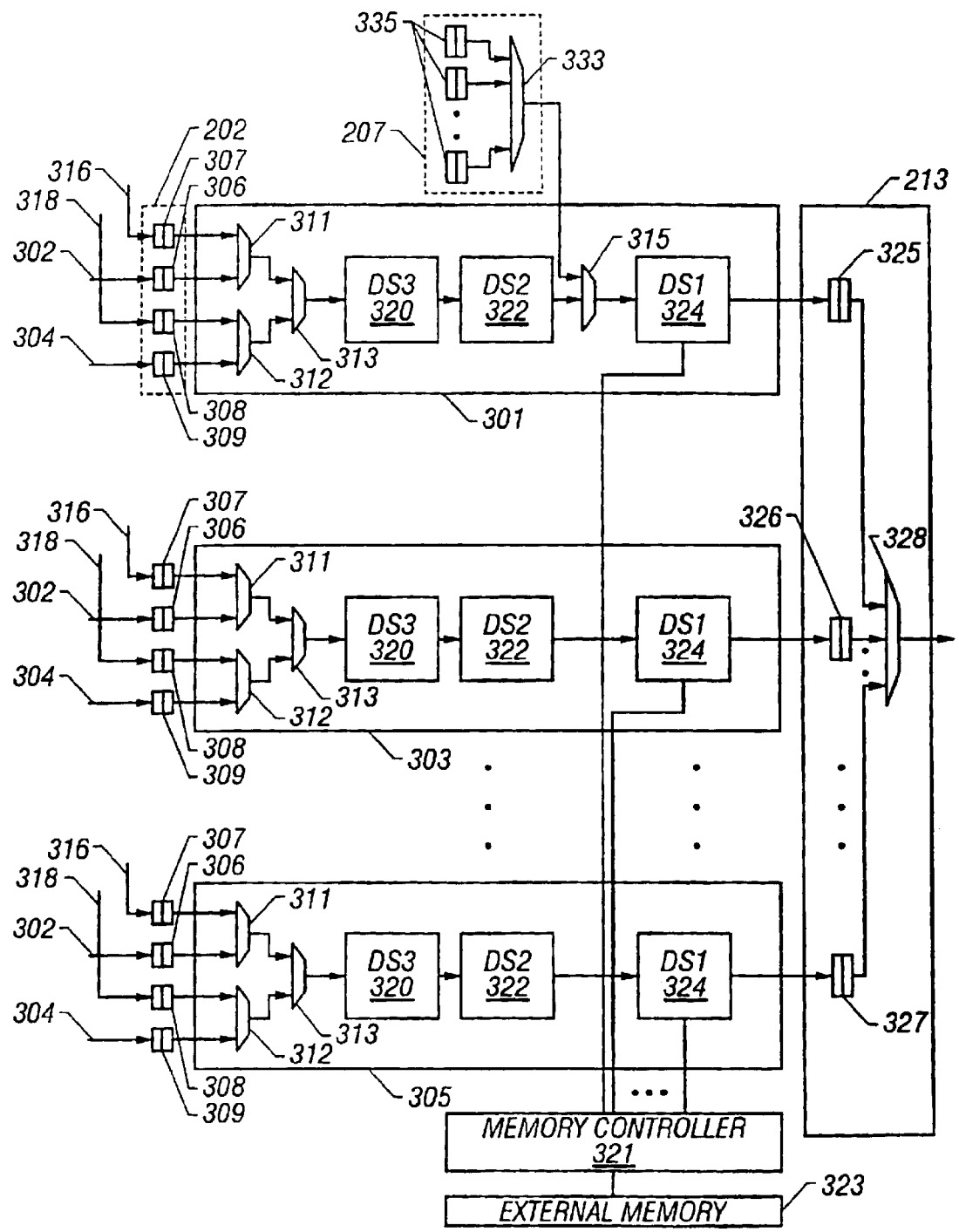
FIG. 3 is an exemplary diagram of deframing slices of the DSn deframing block 250 of FIG. 2 according to one embodiment of the invention.

FIG. 3 is an exemplary diagram of deframing slices of the DSn deframing block 250 of FIG. 2 according to one embodiment of the invention. In FIG. 3, multiple deframing slices 301, 303 and 305 are shown. In this example, each deframing slice has two DS3 inputs 302, 304 from a set of one or more receiving units and two inputs 316, 318 from a set of one or more optical receiving units. Each input flows into one of a set of buffers 306–309. For each of the deframing slices 301, 303, 305, the input 316 flows into the buffer 307 and then goes into a selecting unit 311; the DS3 input 302 flows into a buffer 306 and then into the selecting unit 311; the input 318 flows into the buffer 308 and then into a selecting unit 312; the DS3 input 304 flows into the buffer 309 and continues into the selecting unit 312; and the input selected by the selecting units 311 and 312 then flow into a multiplexer 313.

In one embodiment of the invention, the set of buffers 306–309 are asynchronous First In First Out buffers (FIFOs). The inputs are written into the buffers 306–309 at the DS3 rate and read at the rate of the domain clock. In one embodiment of the invention, the domain clock runs at 100 Mhz in order to process 2 DS3 bit streams (each DS3 running at approximately 45 Mhz) per deframing slice. However, embodiments of the present invention are not so limited, as the domain clock can run at other clock rates that run faster than the sum of the clock rates of the incoming signals. Since each DS3 bit stream may originate from sources running at slightly different clock rates, valid bits accompany DS3 data read out of the asynchronous FIFOs in the clock domain.

For each of the deframing slices 301, 303, and 305, the multiplexer 313 multiplexes the input selected by the selecting units 311 and 312 before sending the multiplexed input into a DS3 deframer 320. Each deframer slice includes the DS3 deframer 320, a DS2 deframer 322, and a DS1 deframer 324.

Each individual deframer processes successively lower bandwidth channels. Since each deframer handles two DS3 bit streams worth of data, though, each deframer actually processes approximately the same total number of bits. The DS3 deframer 320 handles two DS3 channels. The DS2 deframer 322 processes fourteen DS2 channels. The DS1 deframer 324 processes fifty-six DS1 channels. Input flows from the DS3 deframer 320 to the DS2 deframer 322, and then to the DS1 deframer 324. From the DS1 deframer 324 of each of the deframing slices 301, 303, and 305, bits flow into the DS1 data buffer 213 of FIG. 2. The bits from each of the deframing slices 301, 303 and 305 are respectively stored in one of the corresponding buffers 325–327 for bit to byte conversion. Once the data is converted, it is multiplexed by the multiplexing unit 328 and transmitted to a protocol receive unit.

In addition to the DS3 inputs 302, 304 and inputs 306, 308, the deframing slice 301 receives DS1 bit streams from a receiving T1 buffer 348. The receiving T1 buffer includes a set of buffers 335 to buffer individual DS1 signals. The buffered DS1 signals are multiplexed by a multiplexing unit 333 of the receiving T1 buffer 348. The multiplexer 333 passes the multiplexed DS1 signals to the deframing slice 301. When the deframing slice 301 receives DS1 bit streams, it multiplexes the DS1 bit streams with one of the deframed bit streams 302, 304, 316 or 318 of the deframing slice. These inputs are multiplexed at a multiplexer 315 before being sent to the DS1 deframer 324. The DS1 deframer 324 of each of the deframing slices 301, 303 and 305, is connected to a memory controller 321. The memory controller 321 handles read and write operations to an external memory unit 323. The external memory unit 323 stores states for sync hunting which is described later in relation to FIGS. 7, 8A–8B, and 11A–11B. The memory controller 321 serves the DS1 deframer 324 of each deframing slice 301, 303, 305 at the same time. In an example of six deframer slices, each receiving two DS3 bit streams, the memory controller 321 iterates through 168 (6 slices*28 DS1 channels per DS3) channels of possible DS1 sync hunting. In another embodiment of the invention, the order of iteration is subchannel 0–27 for the first DS3 input bit stream (channel 0) followed by subchannels 0–27 for the second DS3 input bit stream (channel 1). In one embodiment of the invention, the memory controller 321 serves all read requests before serving all write requests in the order previously described. Processing requests in this fashion holds read to write bus turnaround to a minimum of once per 168 bus cycles in one embodiment of the invention.

In another embodiment of the invention, every deframing slice 301, 303, 305 only receives one DS3 bit stream input. In another embodiment of the invention, each deframer slice receives one DS3 bit stream input and a set of DS1 bit streams. In another embodiment of the invention, each deframing slice receives inputs from two sets of DS1 bit streams. In another embodiment of the invention, a deframing slice can have N inputs, each of the N inputs independently configurable for either a DS3 input or a set of DS1 inputs.

In one embodiment, each deframer 320, 322, 324 processes its set of channels in a time division multiplex fashion. For example, the DS3 deframer 320 works on the pair of DS3 channels in alternating cycles. The DS2 deframer 322 works on 14 DS2 channels in a circulatory fashion. The order the DS2 deframer 322 circulates through the DS2 subchannels depends on the order in which they are deframed by the DS3 deframer 320. In other words, the DS3 deframer 320 pushes DS2 subchannels into the DS2 deframer 322. Likewise, the order the DS1 deframer 324 circulates through its 56 DS1 subchannels is dictated by the DS2 deframer 322.

Figure 4A:
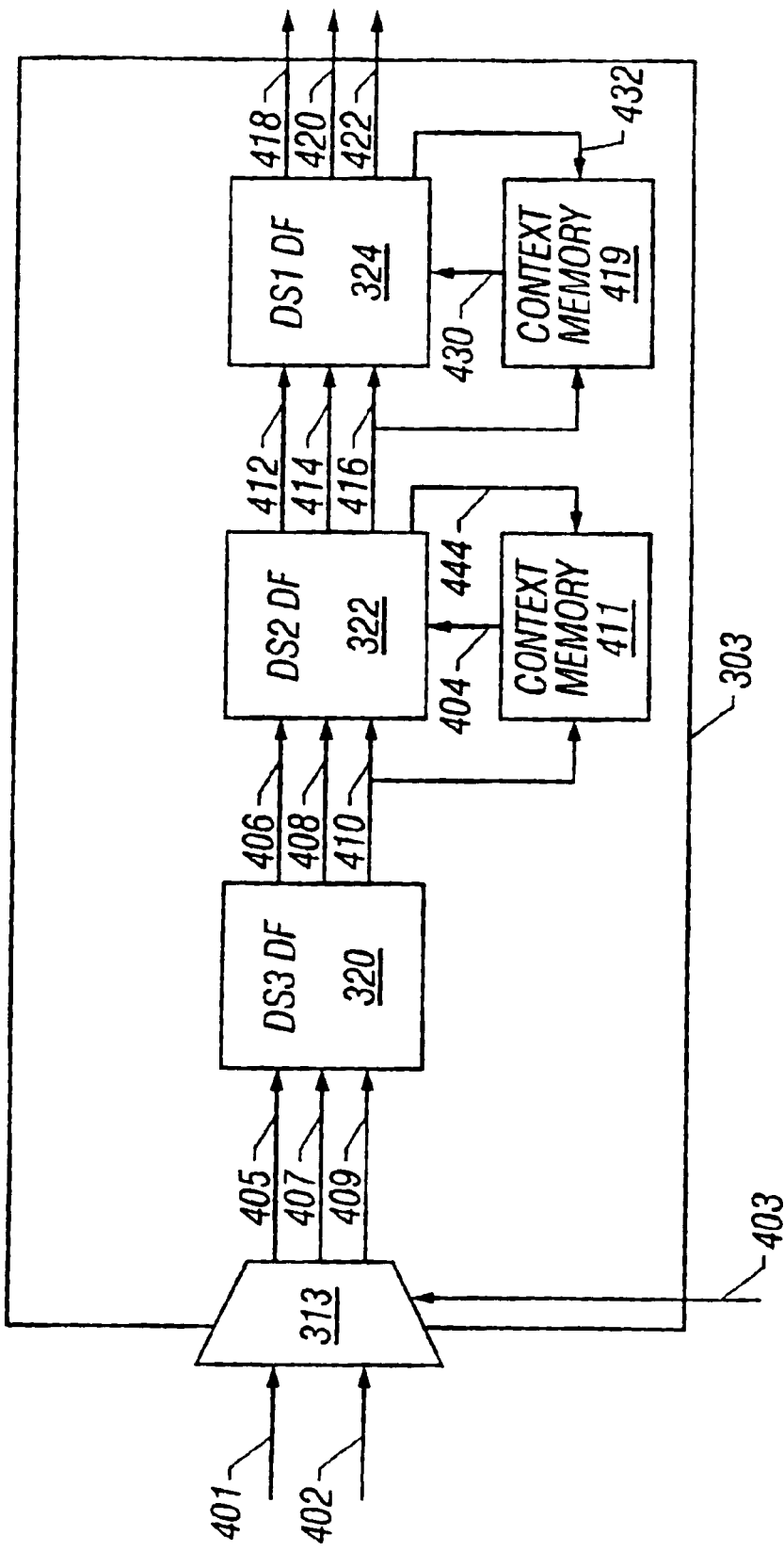
FIG. 4A is a diagram illustrating data flow through the deframing slice 301 of FIG. 3 according to one embodiment of the invention.

FIG. 4A is a diagram illustrating data flow through a deframing slice according to one embodiment of the invention. In FIG. 4A, a data bit stream 401, a data bit stream 402, and a channel select signal 403 flow into a multiplexer 443 of a deframing slice 400. The data bit streams 401 and 402 may include bits from the original DS3 signals and valid bits. From the multiplexer 443, a multiplexed data bit stream 405, a valid bit stream 407 and a channel bit stream 409 flow into a DS3 deframer 450. From the DS3 deframer 450, a data bit stream 406 and a valid bit stream 408 flow into a DS2 deframer at 452. A subchannel bit stream 410 flows into the DS2 deframer 452 and a context memory 411. The context memory 411 includes a per-channel state memory and a sync hunt per-alignment memory for each pair of subchannels, which will be described herein. Information 404 from the context memory 411 flows into the DS2 deframer 452. Updates 444 are written back to the context memory 411. A data bit stream 412 and a validity bit stream 414 flow from the DS2 deframer 452 into a DS1 deframer 454. The subchannel bit stream 416 flows from the DS2 deframer 452 to both the DS1 deframer 454 and a context memory 419. Information 430 from the context memory 419 flows into the DS1 deframer 454. Updates 432 are written back to the context memory 419. A data bit stream 418, a valid bit stream 420, and a subchannel bit stream 422 flow from the DS1 deframer 454 out of the deframing slice 400.

To accommodate 2 DS3 signals (transmitted at approximately 44.736 Mhz each) feeding into a deframing slice, the deframers run at approximately 100 Mhz. Each of the DS3 bit streams appears to flow through 50 Mhz deframers. Having the deframers outrun the bit streams insures that the deframers will be fast enough to deframe all incoming bits. In addition, although each bit stream needs a set of state for deframing (specifically, sync hunting which is a necessary aspect of deframing), the faster rate enables 2 DS3 bit streams to be deframed with one core. A single core logic for 2 DS3 bit streams provides a savings of space. In another embodiment of the invention, a faster clock speed for the deframers, such as 200 Mhz, enables a single core logic to process 4 DS3 bit streams. In another embodiment of the invention, a deframing slice receives N channels or inputs processed at M bits at a time. In such an embodiment, the core clock exceeds the following: sum(n=1 . . . N, clockrate [n]/M).

Figure 4B:
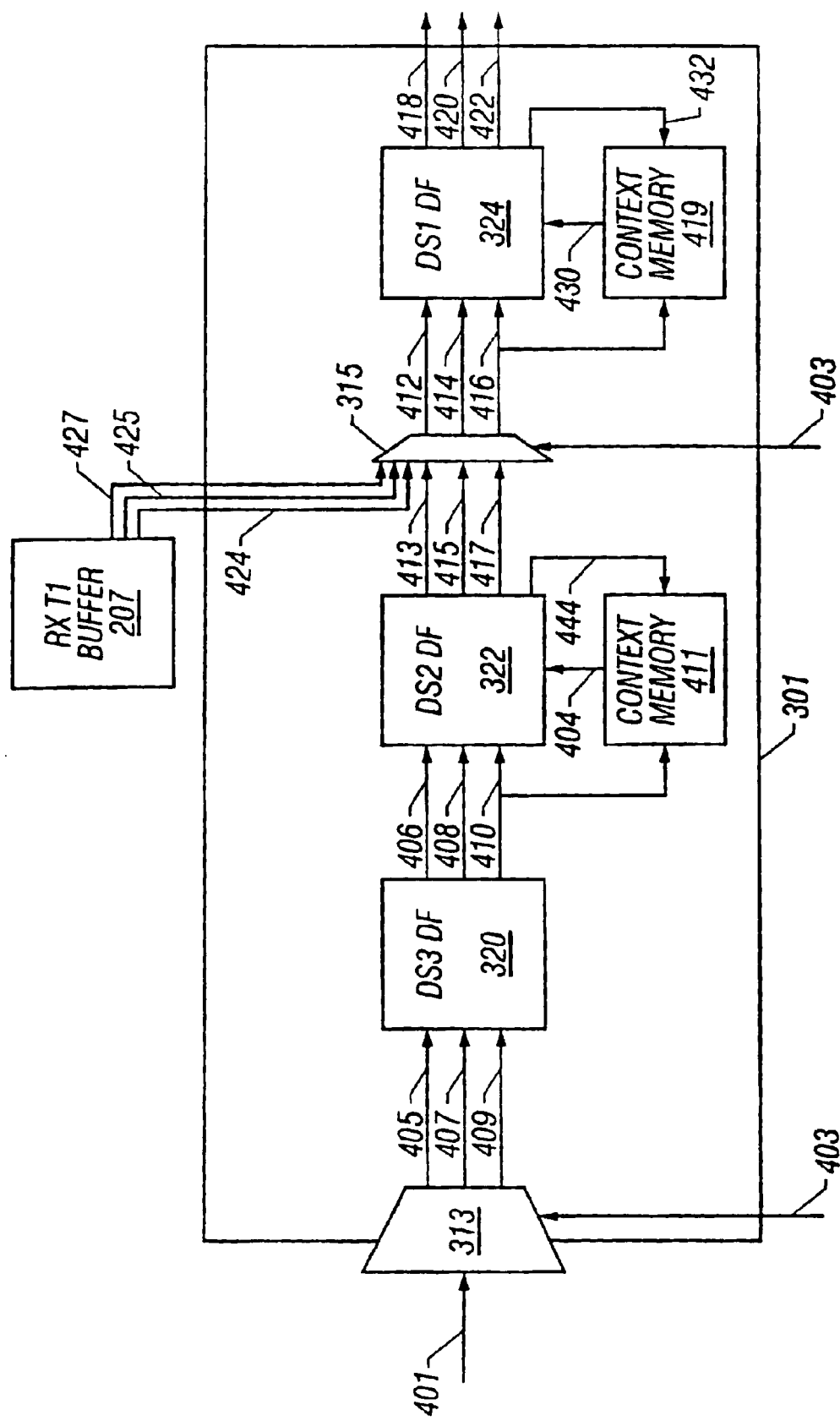
FIG. 4B is a diagram illustrating data flow through either of the deframing slices 303 or 305 of FIG. 3 according to one embodiment of the invention.

FIG. 4B is a diagram illustrating data flow through a deframing slice receiving D53 and DS1 input according to one embodiment of the invention. In FIG. 4B, a data bit stream 401 and a channel select signal 403 flow into the multiplexer 443. From the multiplexer 443, a multiplexed data bit stream 405, a validity bit stream 407, and a channel bit stream 409 flow into the DS3 deframer 450. Although another data bit stream does not flow into the multiplexer 443, the multiplexer 443 multiplexes the data bit stream 401 with a stream of stuffing bits for half of the domain clock's cycles to create the multiplexed bit stream 405.

The DS3 deframer 450 processes the streams 405, 407 and 409 and generates a data bit stream 406, a validity bit stream 408, and a subchannel bit stream 410 which flow into the DS2 deframer 452. The subchannel bit stream 410 also flows into a context memory 411. The context memory 411 includes a per-channel state memory and a sync hunt per-alignment memory for each pair of subchannels. The per-channel state memory and the sync hunt per-alignment memory for each deframer will be described later herein with references to FIGS. 6–12. Information 404 from the context memory 411 flows into the DS2 deframer 452.

The DS2 deframer 452 processes the streams 406, 408, 410 and the information 404 from the context memory 411 to generate a data bit stream 413, a validity bit stream 415, and a subchannel bit stream 417. The streams 413, 415, and 417 flow into a multiplexer 480. Updates 444 are written back to the context memory 411 from the DS2 deframer 452. Data bit streams also flow into the multiplexer 480 from a receiving T1 buffer 482. A data bit stream 427, a validity bit stream 425, and a subchannel bit stream 424 flow into the multiplexer 480 from the receiving T1 buffer 482. The data bit stream 427 and the data bit stream 413 are multiplexed to generate a data bit stream 412. The validity bit streams 415 and 425 are multiplexed to generate a validity bit stream 414. The subchannel bit streams 417 and 424 are multiplexed to generate the bit stream 416. The streams 412, 414, 416 flow into the DS1 deframer 454. The subchannel bit stream 416 also flows into a context memory 419. Information 430 from the context memory flows into the DS1 deframer 454. The context memory 419 and the information 430 stored in the context memory 419 are described later.

The DS1 deframer 454 processes the bit streams 412, 414, 416 and the information 430 from the context memory 419. After processing, the DS1 deframer 454 generates a data bit stream 418, a validity bit stream 420, and a subchannel bit stream 422. Updates 432 are written back to the context memory 419 from the DS1 deframer 324.

Figure 5:
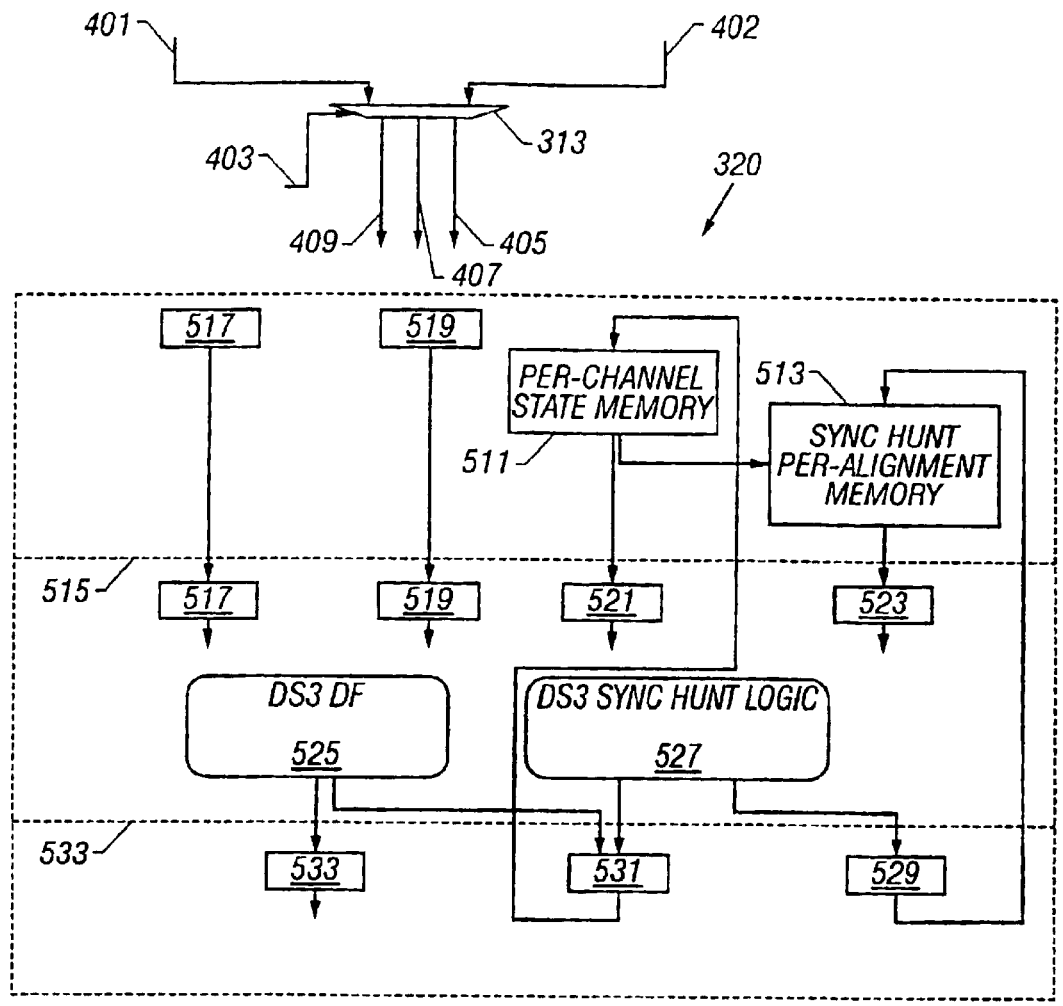
FIG. 5 is a diagram of the DS3 deframer 320 of FIG. 3 according to one embodiment of the invention.

FIG. 5 is a diagram of a DS3 deframer according to one embodiment of the invention. In FIG. 5, a DS3 deframer 500 receives bit streams from a source external to the DS3 deframer 500. The two DS3 data bit streams 401 and 402 of FIG. 4A feed into a multiplexing unit 443. The channel select signal 403 also feeds into the multiplexing unit 443. The multiplexing unit 313 multiplexes the DS3 bit streams 401 and 402 to create the multiplexed DS3 data bit stream 405 that is fed into the DS3 deframer 500 along with the valid bit stream 407 and the channel bit stream 409. A dashed line 515 indicates a first pipe stage. In the first pipe stage, a per-channel state memory 511 sends information to a sync hunt per-alignment memory 513. The per-channel state memory 511 also sends information to a register 521. Bits indicating the per-alignment state are transmitted from the sync hunt per-alignment memory 513 to a register 523. Also in the first pipe stage, the data bit stream 409 is stored in a register 517 while the streams 405, 407 are stored in a register 519. A dashed line 533 indicates a second pipe stage of the DS3 deframer 500. In the second pipe stage, bits from the registers 517, 519, 521 and 523 flow to a DS3 deframing logic 525 and a DS3 sync hunt logic 527. The bits flowing from the register 517 indicate side (i.e., channel). In this example, the side information from the register 517 indicates whether the bit stream from the register 519 is the DS3 bit stream 401 or the DS3 bit stream 402. Data from the register 521 indicates a global state for the DS3 deframer and a counter value indicating location within a subframe for a given DS3 signal. The global state is described later in more detail with reference to FIGS. 8A–8B. The bits from the register 523 indicate the per-alignment state. Output from the DS3 sync hunt logic 527 flows into a set of registers 529, 531. The register 531 also receives input from the DS3 deframing logic 525. The bits stored in register 531 loop back into the per-channel state memory 511. The bits stored in the register 529 flow back into the sync hunt per-alignment memory 513. Output from the DS3 deframing logic 525 is also stored in a register 533 before flowing to a DS2 deframer.

Figure 6:
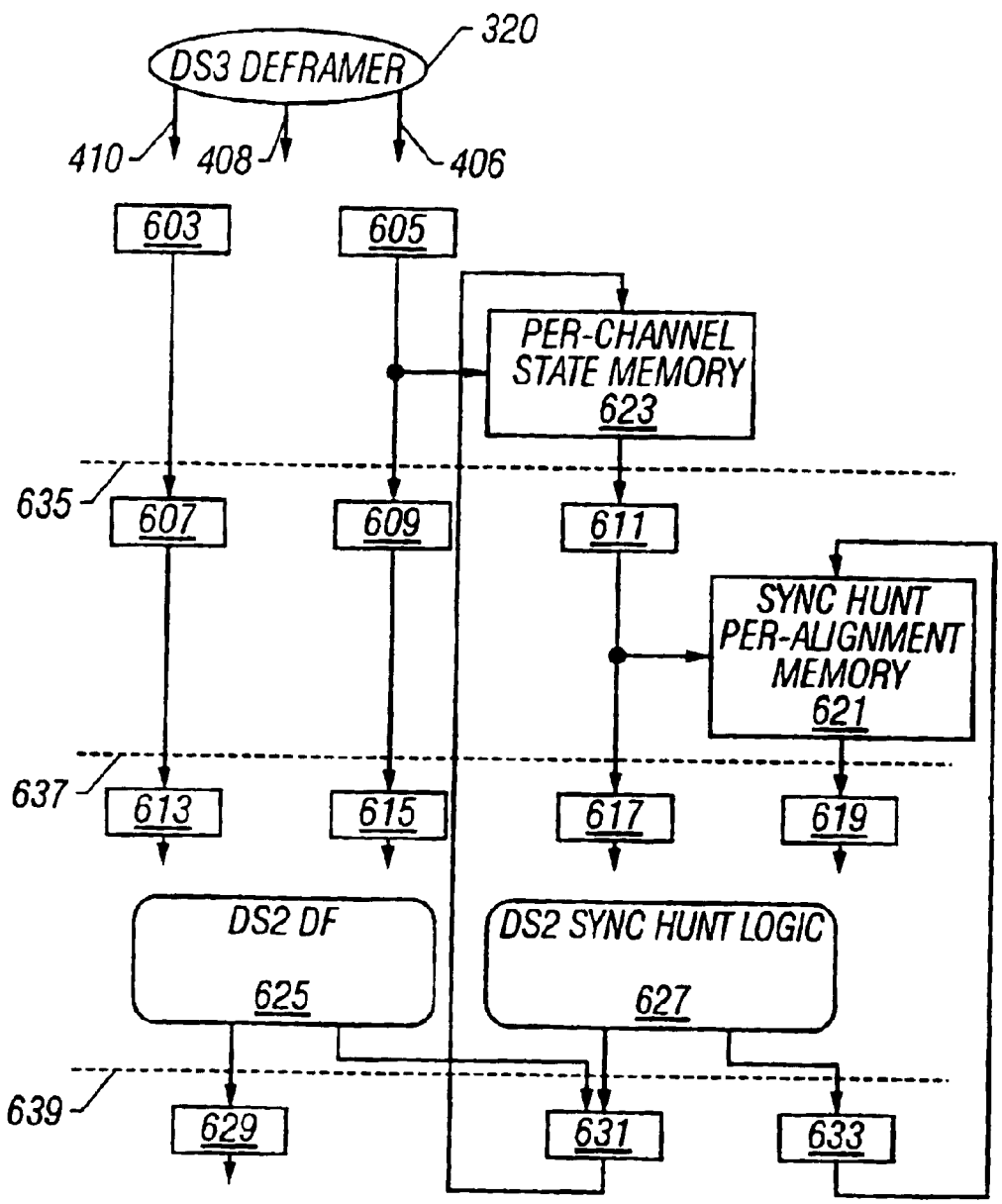
FIG. 6 is a diagram of the DS2 deframer 322 of FIG. 3 according to one embodiment of the invention.

FIG. 6 is a diagram of a DS2 deframer according to one embodiment of the invention. The data bit stream 406, the validity bit stream 408 and the subchannel bit stream 410 flow from the register 531 of the DS3 deframer 500 to the DS2 deframer illustrated in FIG. 6. The bits stored in a register 605 are from the subchannel bit stream 410 and the data bit stream 406. The bits stored in a register 603 are from the validity bit stream 408. A dashed line 635 indicates a first pipe stage of the DS2 deframer. In the first pipe stage, bits flow from the register 603 to the register 607 and from the register 605 to a register 609. In addition, the bits from the register 605 flow through a per-channel state memory 623 and into a register 611. A dashed line 637 indicates a second pipe stage of the DS2 deframer. In the second pipe stage, bits stored in the registers 607, 609 and 611 flow into registers 613, 615 and 617 respectively. The bits from the register 611 also flow through a sync hunt per-alignment memory 621 and into a register 619. A third dashed line 639 indicates a third pipe stage for the DS2 deframer 322. The bits stored in the registers 613, 615, 617 and 619 flow into a DS2 deframing logic 625 and a DS2 sync hunt logic 627. After being processed by the DS2 sync hunt logic 627, bits are stored in a register 633 before flowing back into the sync hunt per-alignment memory 621. Output from both the DS2 deframing logic 625 and the DS2 sync hunt logic 627 is stored in a register 631. From the register 631, bits flow back into the per-channel state memory 623. Output from the DS2 deframing logic 625 also flows into a register 629 before continuing on to a DS1 deframer.

Figure 7:
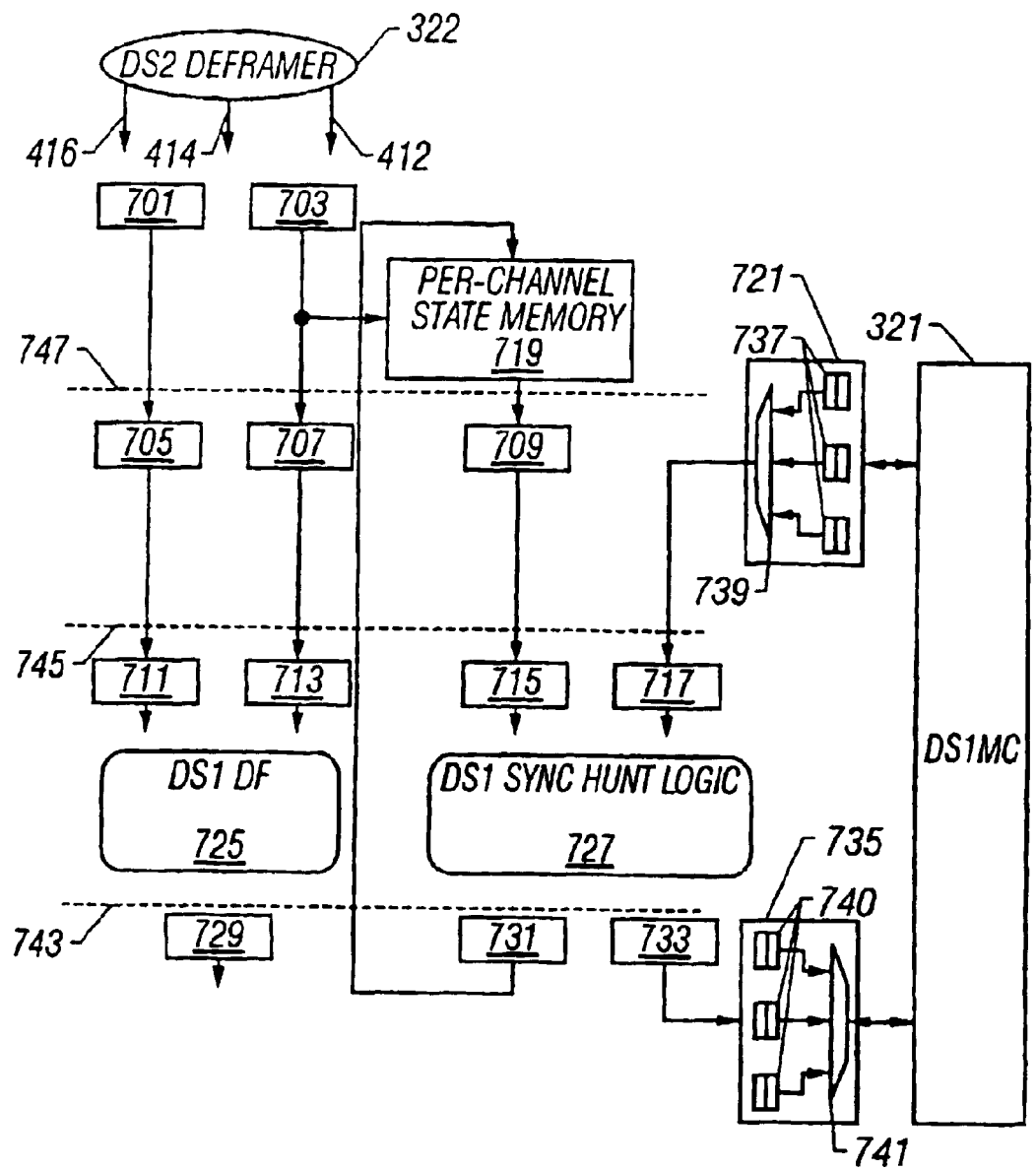
FIG. 7 is a diagram of the DS1 deframer 324 according to one embodiment of the invention.

FIG. 7 is a diagram of a DS1 deframer according to one embodiment of the invention. The data bit stream 412, validity bit stream 414, and the subchannel bit stream 416 flow from a DS2 deframer 750 to a set of registers 701 and 703. The bits stored in the register 701 are from the validity bit stream 413. The bits stored in the register 703 are from the data bit stream 412 and the subchannel bit stream 416. A dashed line 747 indicates a first pipe stage of the illustrated DS1 deframer. In the first pipe stage, bits from the registers 701 and 703 flow into registers 705 and 707 respectively. The bits from the register 703 also flow through a per-channel state memory 719 and into a register 709. A dashed line 745 indicates a second pipe stage of the DS1 deframer 324. The bits in the registers 705, 707 and 709 flow into a set of registers 711, 713 and 715 respectively. The data stored in the register 709 indicates a global state for the DS1 deframer and a counter indicating location within a subframe for a given DS2 signal carried in the DS3 signal. The DS1 global states and the counter are described later in more detail with reference to FIGS. 14A–14B, 16A–16B, and 18. In the second pipe stage of the illustrated DS1 deframer, bits flow from a sync hunt read buffer 721 to a register 717. A memory controller 761 stores bits indicating per-alignment state into a set of read FIFOs 737 of the sync hunt read buffer 721. A selector 739 of the sync hunt read buffer 721 selects the per-alignment state bits stored in the set of FIFOs 737 to be stored in the register 717. A dashed line 743 indicates a third pipe stage of the DS1 deframer 324. In the third pipe stage of the DS1 deframer 324, bits from the registers 711, 713, 715 and 717 flow into a DS1 deframing logic 725 and a DS1 sync hunt logic 727. After processing by the DS1 deframing logic 725, the bits previously stored in the registers 711 and 713 are stored in a register 729. After processing by the sync hunt logic 727, bits from the register 715 are stored in a register 731 before looping back to the per-channel state memory 719. The per-alignment state bits stored in the register 717 are processed by the DS 1 sync hunt logic 727 and stored in a register 733. The bits in the register 733 flow into a sync hunt write buffer 735. These bits are stored in a set of FIFOs 740 of the sync hunt write buffer 735 and accessed by a selector 741, before being processed by the memory controller 761.

In one embodiment of the invention, each pair of DS1 subchannels (e.g. the pair of DS 1 subchannels DS1 subchannel 0 of DS3 side 0 and DS1 subchannel 0 of DS3 side 1) has a read and write FIFO that is two 7 byte entries deep. This size provides space for 14 sync hunt states. The entries in each FIFO provide enough latency tolerance to keep the sync hunt logic working while the memory controller 321 serves other channels. Each one of the deframing slice's FIFOs are independently writable and readable. The memory controller 761 writes to the read FIFOs. The sync hunt core reads the read FIFOs. The sync hunt core writes to the write FIFOs and the memory controller reads from the write FIFOs. In one embodiment of the invention, the FIFOs are asynchronous because each DS3 bit stream may run at a different bit rate. In one embodiment of the invention, each DS1 sync hunt begins by flushing the read and write FIFOs of any possible stale sync hunt data. The sync hunt logic then allows the read FIFO to become full. After the read FIFO is full, sync hunting begins. The memory controller and asynchronous FIFOs ensure sufficient provision of bandwidth to the DS1 sync hunt logic. In another embodiment of the invention, the read/write FIFOs are larger to accommodate higher density deframing slices.

In one embodiment of the invention, the addressing pointers for the sync hunt memory 323 (shown in FIG. 3) are stored in the FIFO core 721, 735. Placing the addressing pointers in the FIFO core 721, 735 reduces the complexity of resetting and controlling the addressing pointers. In another embodiment of the invention, the addressing pointers are stored in the memory controller 761. In one embodiment of the invention, which stores the addressing pointer in the memory controller 761, a register array for each deframer slice is placed in a larger register array that is placed in the memory controller 761. Such a design provides the benefit of reducing the hardware necessary for implementing the deframer.

As shown by FIGS. 5–7, each deframer performs both sync hunting and deframing. Sync hunting is performed by the sync hunt logics 527, 627, and 727. After synchronization, a bit stream is deframed by the corresponding one of the deframing logics 525, 625, 725 while the sync hunt logic continues to monitor sync. If a channel gets out of sync, sync hunt for that channel is restarted.

In one embodiment of the invention, each deframer sync hunts half of the total number of channels because the sync hunt memory is shared. Limiting the sync hunting reduces the space necessary to implement the deframer. In such an embodiment, each deframing slice can process channels from two DS3 bit streams, but sync hunts one of those bit streams. For example, the DS3 deframer sync hunts either the first DS3 bit stream or the second DS3 bit stream, but not both at the same time. Deframing (i.e., identification of payload and overhead bits) is conducted for both channels simultaneously as it is not costly to implement. The DS2 deframer sync hunts either a DS2 channel from the first DS3 bit stream or a DS2 channel from the second DS3 bit stream, but not DS2 channels from both DS3 bit streams. Similarly, the DS1 deframer sync hunts DS1 channels from either the first DS2 bit stream or the second DS3 bit stream.

Synchronizing a bit stream (sync hunting) comprises searching for a bit pattern formed by an alignment signal. For example, a DS3 frame includes seven subframes. Each subframe comprises eight 85 bit blocks. The first bit of each block is an overhead bit which includes bits of the alignment signal. For a DS3 signal, the alignment signal includes F-bits and M-bits. The F-bits or framing bits form a bit pattern "1001" in each subframe at blocks two, four, six, and eight. Each F-bit is separated by 170 bits. The M-bits or multiframing bits form a bit pattern "010". The M-bits occur in the first block of the fifth, sixth, and seventh subframe. It should be understood that the invention is not limited to these bit patterns. In another embodiment of the invention, the logic searches for different bit patterns to synchronize a bit stream or signal. The sync hunting logic 527, 627 maintains multiple per-alignment state machines to be described. The sync hunt logic performs sync hunting concurrently for multiple per-alignment state machines using a single bit. The logic determines if the bit matches the F-bit pattern for one per-alignment state machine and the M-bit pattern for a different per-alignment state machine. The sync hunting is described in more detail with reference to FIGS. 8A–12.

Figure 8A:
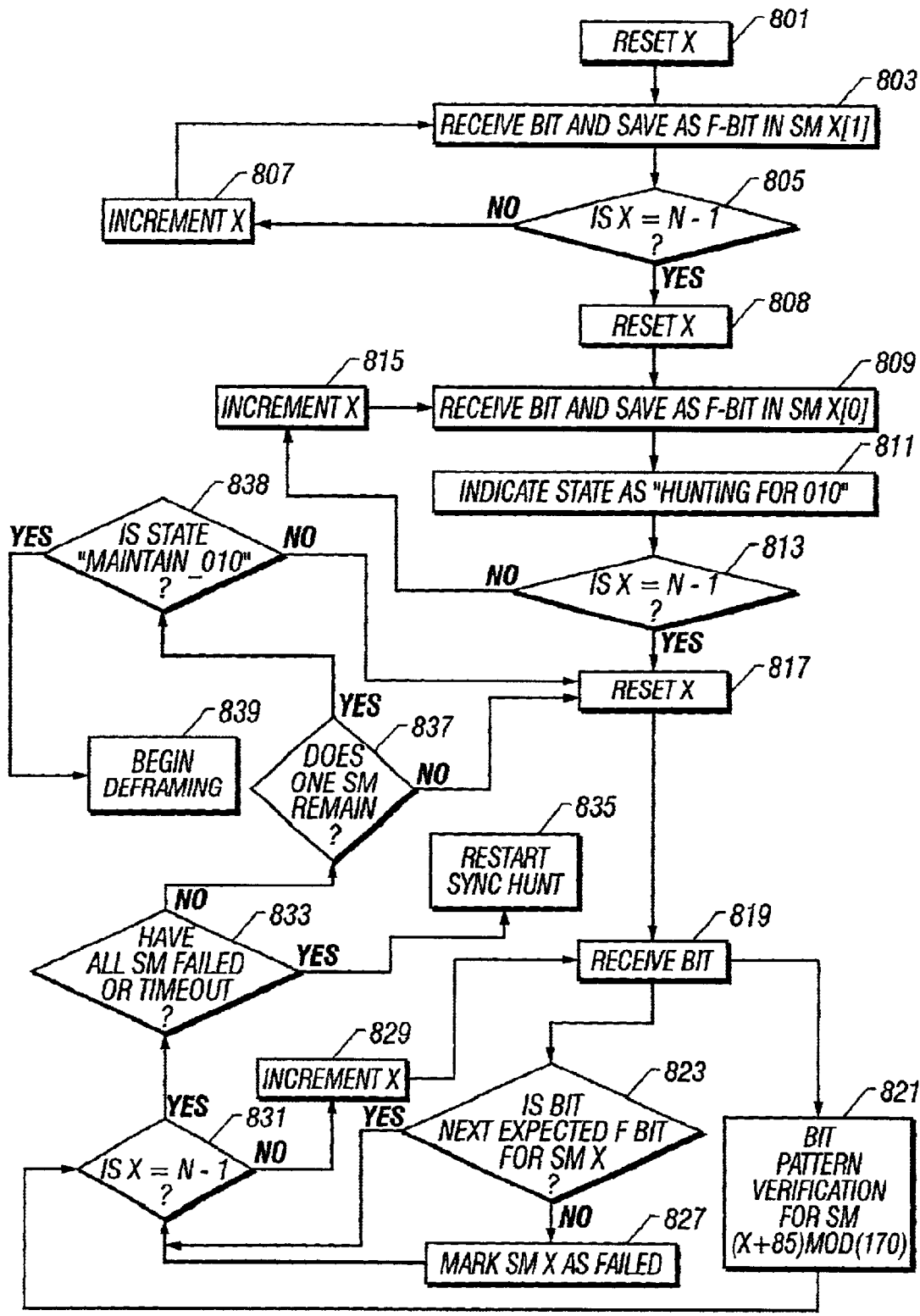
FIG. 8A is a flow chart for DS3 sync hunting according to one embodiment of the invention.
Figure 8B:
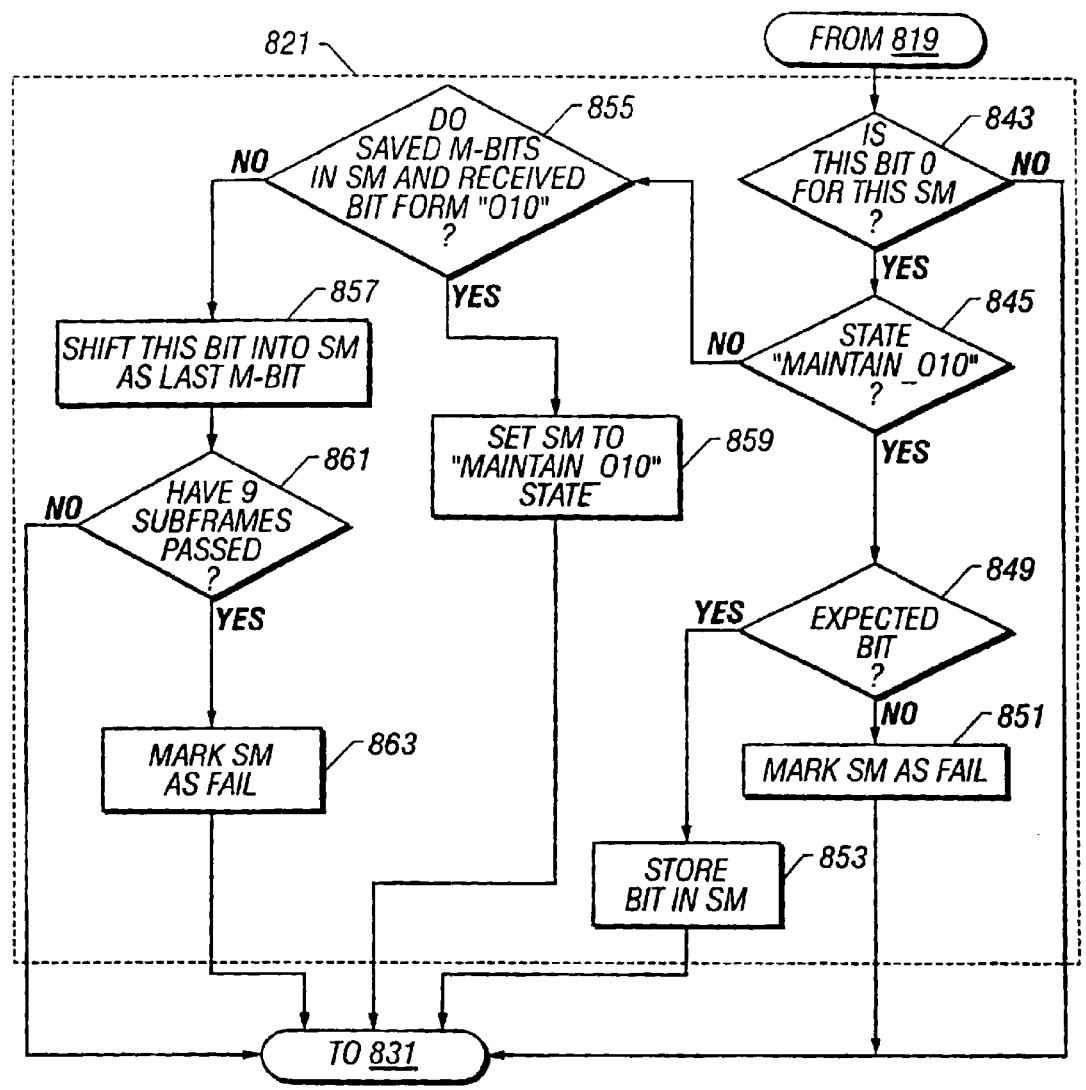
FIG. 8B is a flow chart for performing block 821 of FIG. 8A according to one embodiment of the invention.

FIGS. 8A–8B are flow charts for DS3 sync hunting according to one embodiment of the invention. FIG. 8A is a flow chart for DS3 sync hunting according to one embodiment of the invention. As indicated in FIG. 5, bits are used from the registers 517, 519, 521 and 523. If a bit stored in the register 517 indicates invalidity, then a corresponding signal bit stored in the register 519 is not processed by the following logic. The term signal bit is used to distinguish data bits of the data bit stream from stuffing bits added to the data bit stream by the receiving network element. The signal bits (data bits) can be categorized as payload bits or overhead bits. Although a signal bit may be a payload bit from the perspective of the DS3 deframer, it may be an overhead bit from the perspective of the DS2 or DS1 deframer. The following logic is performed for each subchannel or side.

At block 801 of FIG. 8A, a value X is reset. The value X represents the per-alignment state machine being used. At block 803, a signal bit from the register 519 is received and saved as a first framing F-bit in a subframe alignment shift register for a per-alignment state machine X.

At block 805, it is determined if X=N−1(N being the total number of per-alignment state machines). This check determines if the logic has iterated through all of the per-alignment state machines. If it is determined that X is not equal to N−1, then at block 807, X is incremented. From block 807, control flows back to block 803. If, at block 805, it is determined that X=N−1, then at block 808 X is reset. At block 809, another signal bit is received from the register 519 and saved as the second F-bit in the subframe alignment shift register for a per-alignment state machine X.

Figure 9:
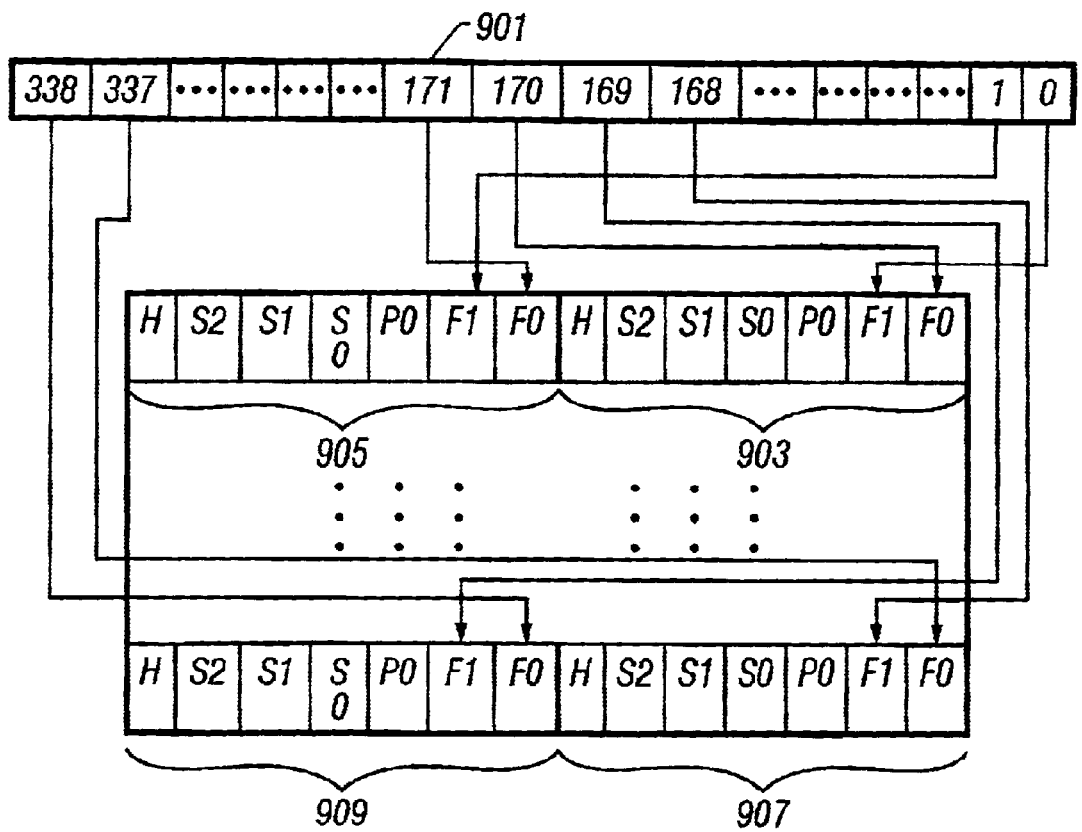
FIG. 9 illustrates an example of storing DS3 bits in per-alignment state machines as potential framing bits according to one embodiment of the invention.

FIG. 9 illustrates an example of storing DS3 bits in per-alignment state machines as potential framing bits according to one embodiment of the invention. The example illustrated in FIG. 9 includes 170 per-alignment state machines for a DS3 signal. In FIG. 9, only four of the 170 per-alignment state machines are shown. A DS3 bit stream 901 is received and stored as described in FIG. 8A. A bit 0 (the first bit) of the bit stream 901 is stored in F1 (first F-bit) of per-alignment state machine 0 903 (the first per-alignment state machine). The next bit, bit 1, is stored as F1 in per-alignment state machine 1 905 (the second per-alignment state machine). Bits 168 and 169 are stored as F1 in per-alignment state machines 168 908 and 169 909 respectively. The bits 170 and 171 of the bit stream 901 are stored as F0 (the second F-bit) in the per-alignment state machines 0 901 and 1 903. Bits 337 and 338 of bit stream 901 are stored in the per-alignment state machines 168 907 and 169 909 respectively as F0.

Returning to FIG. 8A, after this second F-bit is stored at block 809, a sync hunt state machine for the per-alignment state machine X is set to indicate state as "HUNTING_010" at block 811. The per-alignment state machine is described in Table 1.

TABLE 1

State Encoding for DS3 Sync Hunt

| State Bits (most significant bit to least significant bit) | State Machine Action |
| --- | --- |
| 0 - H1 H0 - F1 F0 | Shift0<br>Shift in potential first F-bit into F0 |
| 0 - H1 H0 - F1 F0 | Shift1<br>Shift F0 to F1 and shift potential second bit into F0 |
| 0 - H1 H0 - F1 F0 | Hunt0, Hunt1<br>+ Freeze {F1, F0},<br>use to check incoming potential F-bits<br>+ Shift incoming potential M-bits into {H1, H0} shift register. If {H1, H0, incoming bit} = 010, then go to Maintain_010 state and set {S2, S1, S0} = X1, else if 10 subframes have passed, then fail, else continue Hunt0, Hunt1 state |
| 1 S2 S1 S0 P F1 F0 | Maintain_010<br>+ continue to use {F1, F0} to check incoming potential F-bits<br>+ {S2, S1, S0} forms a state machine to check incoming potential M-bits. Remember previous potential M-bit using P, and use to check that potential framing bits match patterns X1=X2, P1=P2. |
| 1 1 1 1 - - - | Fail |

At block 813 it is determined if X=N−1. If X does not equal N−1, then at block 815 X is incremented. From block 815 control flows back to block 809. If it is determined at block 813 that X equals N−1, then at block 817 X is reset. At block 819 a signal bit is received from the register 519. From block 819, control flows to both blocks 821 and 823. At block 821, framing bit pattern verification for a per-alignment state machine (X+85) MOD 170 is performed concurrently with verification of F-bits for a per-alignment state machine X at block 823.

At block 823, it is determined if the bit received at block 819 is the next expected F-bit for a per-alignment state machine X. If the received bit is the next expected F-bit for the per-alignment state machine X, then at block 831 it is determined if X=N−1. If at block 823 it is determined that the bit is not the next expected F-bit for the per-alignment state machine X, then at block 827 the sync hunt state machine for the per-alignment state machine X is set to indicate failure. From block 827 control flows to block 831. If X does not equal N−1, then at block 829 X is incremented. From block 829 control flows back to the block 819. If it is determined at block 831 that X equals N−1, then at block 833 it is determined if all per alignment state machines have failed or a time out has occurred. If all of the per-alignment state machines have failed or a timeout has occurred, then at block 835 the DS3 sync hunting restarts. In an alternative embodiment of the invention, a timeout forces the sync hunt logic to select one of the per-alignment state machines which have not failed. If it is determined at block 833 that all of the per-alignment state machines have not failed and a timeout has not occurred, then at block 837 it is determined if only one per-alignment state machine remains valid. If it is determined at block 837 that more than one per-alignment state machine still remains valid, then control flows to block 817. If only one per-alignment state machine remains valid, then it is determined if the per-alignment state machine indicates a state of "MAINTAIN_010" at block 838. If it is determined that the per-alignment state machine indicates "MAINTAIN_010", then the DS3 framing pattern has been detected and at block 839 DS2 deframing begins. If it is determined at block 838 that the per-alignment state machines does not indicate "MAINTAIN_010", then control flows to block 817.

FIG. 8B is a flow chart for performing block 821 of FIG. 8A according to one embodiment of the invention. From block 819 of FIG. 8A control flows to a block 843. At block 843, it is determined if the received bit is bit 0 for a subframe of a per-alignment state machine (X+85) MOD 170. If the received bit is not bit 0 for a subframe of this per-alignment state machine, then control flows back to block 831 of FIG. 8A. If it is determined at block 843 that the received bit is a bit 0, then at block 845 it is determined if the sync hunt state machine for this per-alignment state machine indicates a state of "MAINTAIN_010". If the sync hunt state machine for this per-alignment state machine indicates "MAINTAIN_010", then at block 849 it is determined if the received bit is the correct bit in accordance with the state indicated by the sync hunt state machine. The states represented by the sync hunt state machine s2–s0 are shown in table 2.

TABLE 2

States Represented by Sync Hunt State Machine

| s2 s1 s0 | state name |
| --- | --- |
| 0 | S0 |
| 1 | S01 |
| 2 | S010 |
| 3 | SX1 |
| 4 | SX2 |
| 5 | SP1 |
| 6 | SP2 |
| 7 | FAIL |

Each state represents a transitions state. The state S0 means the sync hunt logic is looking for the bit 0. The state S01 means the sync hunt state machine has stored a previous bit 0 and is looking for a bit 1. The state S010 means the sync hunt logic saw a 1 as the previous bit and is looking for a 0. The state SX1 represents a transition in the sync hunt to looking for the first X framing bit. The state SX2 means the sync hunt logic is hunting for the second X framing bit that should be the same as the P bit shown in table 1 (the first X framing bit). The state SP1 represents a transition in the sync hunt to looking for the first P framing bit. The state SP2 means the sync hunt logic is hunting for the second P framing bit that should be the same as the P bit shown in table 1 (first P framing bit).

If the received bit is not the correct bit in accordance with the indicated state, then at block 851 the sync hunt state machine for this per-alignment state machine is set to indicate a state of fail. From block 851, control flows back to block 831 of FIG. 8A. If at block 849 it is determined that the received bit is the correct bit in accordance with the sync hunt state machine, then at block 853 the bit is shifted into the sync hunt state machine for this per-alignment state machine, thus updating the state. From block 853, control flows back to block 831 of FIG. 8A. If at block 845, it is determined that the sync hunt state machine for this per-alignment state machine does not indicate state as "MAINTAIN_010", then at block 855 it is determined if the M-bits stored in the sync hunt state machine and the received bit form a bit pattern "010". If all of these bits form the bit pattern "010", then at block 859 the sync hunt state machine of this per-alignment state machine is set to indicate maintenance state or "MAINTAIN_010". Control flows from block 859 to block 831 in FIG. 8A. If at block 855 it is determined that the framing M-bits stored in the sync hunt state machine and the received bit do not form the bit pattern "010", then at block 857 the received bit is shifted into the sync hunt state machine as H0 and the bit stored as H0 is shifted into H1 of the sync hunt state machine. At block 861 it is determined if nine subframes have passed based on the counter and global state bits from the register 521 of FIG. 5. If nine frames have not passed for this per-alignment state machine, then control flows to block 831 of FIG. 8A. If it is determined at block 861 that nine subframes have passed for the per-alignment state machine, then at block 863 the sync hunt state machine for this per-alignment state machine is set to indicate a state of fail. From block 863, control flows to block 831 of FIG. 8A.

A DS3 master state machine controls the DS3 per-alignment state machines. The DS3 master state machine initializes and maintains the per-alignment state machines. The states of the DS3 master state machine are described in Table 3 below.

TABLE 3

DS3 Master States

| | |
|---|---|
| SH3_IDLE | channel is idle |
| SH3_SHIFT_SF0 | first subchannel of hunt - used to reset states |
| SH3_SHIFT_SF1 | second subchannel of hunt |
| SH3_HUNT0 | hunting |
| SH3_HUNT1 | hunting, after 10 frames |
| SH3_WAIT_WINNER | found a single winner, but now wait for winner again; the purpose is to simplify the counter logic in the DS3 deframers |

The states of the master state machine can be represented with a variety of values. In one embodiment of the invention, a S113_WAIT_WINNER state is not maintained.

Figure 10:
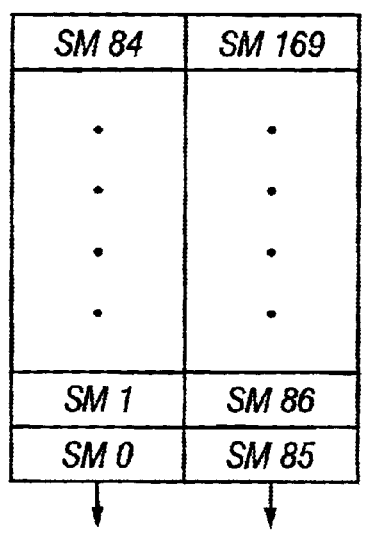
FIG. 10 is a diagram illustrating organization of the per-alignment state machines in the sync hunt per-alignment memory 513 of FIG. 5 according to one embodiment of the invention.

FIG. 10 is a diagram illustrating organization of the per-alignment state machines in the sync hunt per-alignment memory 513 of FIG. 5 according to one embodiment of the invention. In FIG. 10, the per-alignment state machines are arranged as two columns of 85 per-alignment state machines. This organization of the per-alignment state machines allows the use of a single port register array instead of a dual port register array. This organization also allows the sync hunt logic to accomplish 2 tasks concurrently: both the task of verifying subframe alignment with F-bit patterns for a per-alignment state machine X and the task of verifying framing bit patterns for a per-alignment state machine (X+85) MOD 170. In one embodiment, each per-alignment state machine is 7 bits wide. In another embodiment, each per-alignment state machine is wider.

In the DS2 format, a DS2 frame is comprised of four subframes. Each subframe includes six 49 bit blocks. Each block includes an overhead bit followed by 48 bits. An M-bit is the overhead bit for the first block of each subframe. The M-bits form either the bit pattern "0111" or "0110" in a given DS2 frame. An F-bit is the overhead bit for blocks three and six of each subframe. The two F-bits of a subframe form the bit pattern "01" in each subframe. The DS2 alignment bit patterns are used to aid in the understanding of the invention and not as limitations upon the invention.

Figure 11A:
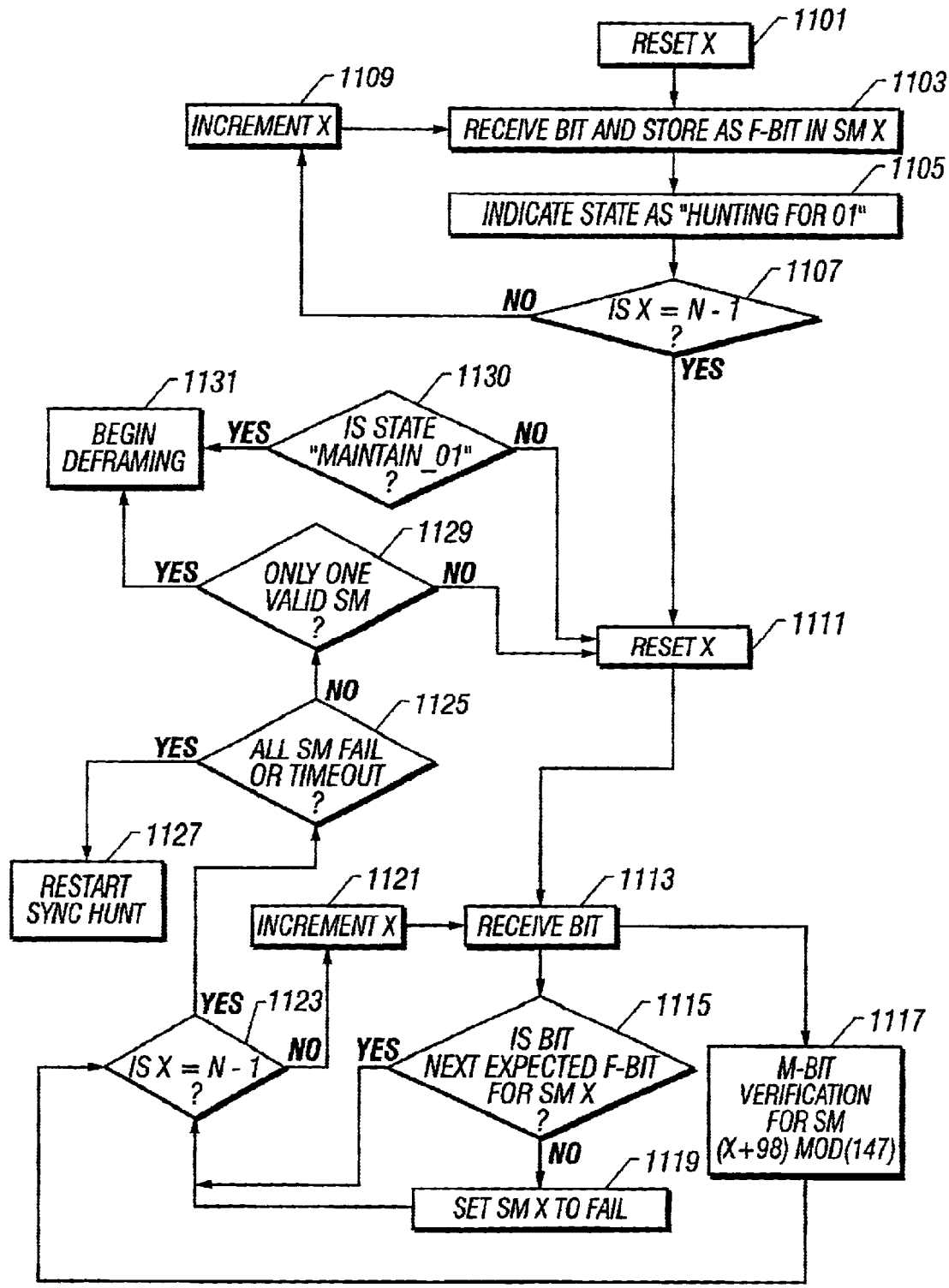
FIG. 11A is a flow chart for performing DS2 synchronization hunting according to one embodiment of the invention.
Figure 11B:
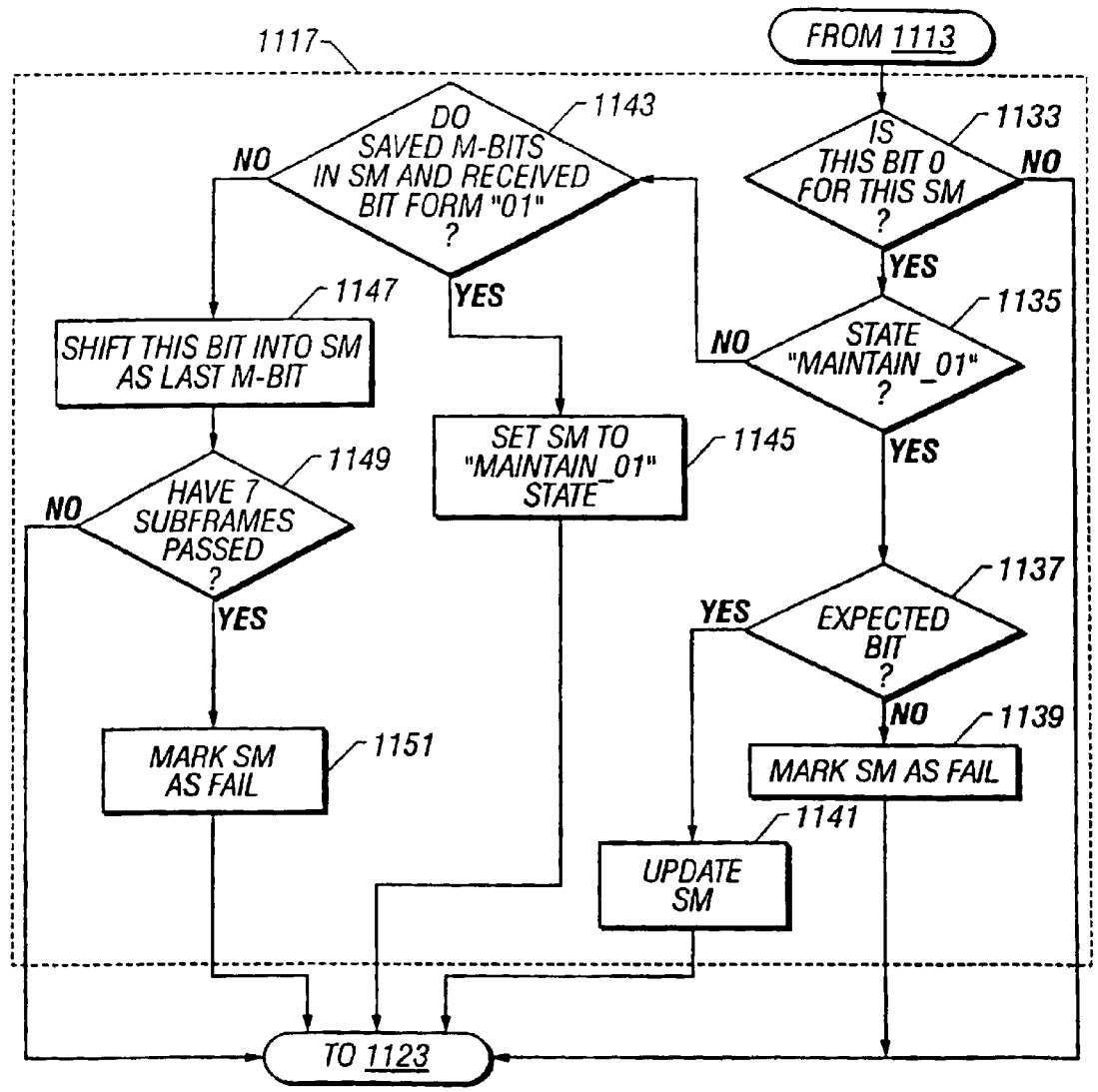
FIG. 11B is a flow chart for performing block 1117 of FIG. 11A according to one embodiment of the invention.

FIGS. 11A–11B are flow charts for DS2 sync hunting according to one embodiment of the invention. FIG. 11A is a flow chart for performing DS2 synchronization hunting according to one embodiment of the invention. If a valid bit from the register 613 indicates invalidity for a corresponding signal bit from the register 615, the following logic is not performed on the invalid signal bit. At block 1101, a value X is initialized. Again, the value X represents a per-alignment state machine being used. At block 1103, a signal bit from the register 615 is received and saved as a first framing F-bit in a subframe alignment shift register of a per-alignment state machine X. At block 1105, the sync hunt state machine for the per-alignment state machine X is set to indicate "HUNTING_01".

Figures 12, 13:
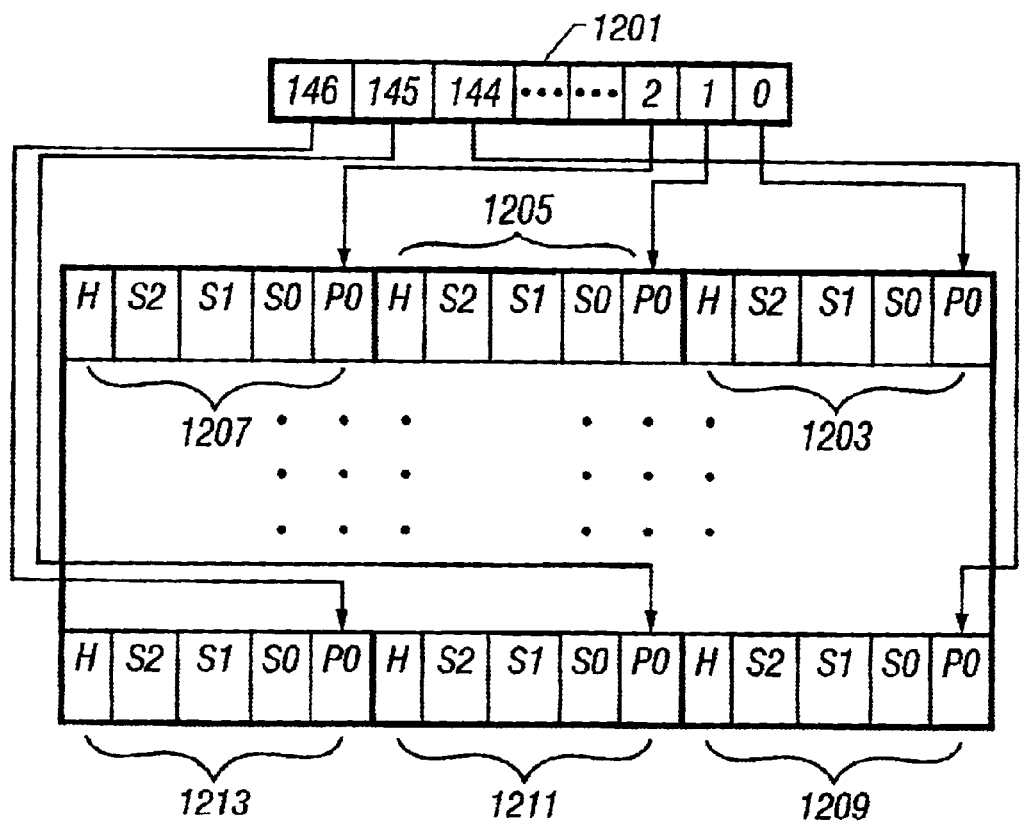
FIG. 12 illustrates an example of storing bits in DS2 per-alignment state machines as potential alignment bits according to one embodiment of the invention.
FIG. 13 is a diagram illustrating organization of the per-alignment state machines in the sync hunt per-alignment memory 621 of FIG. 6 according to one embodiment of the invention.

FIG. 12 illustrates an example of storing bits in DS2 per-alignment state machines as potential alignment bits according to one embodiment of the invention. In FIG. 12, a bit stream 1201 is received. In this example, there are 147 per-alignment state machines, but only six per-alignment state machines are shown. Bits 0, 1, and 2 of the bits stream 1201 are stored as P0 in per-alignment state machines 1203, 1205, and 1207 respectively. Bits 144, 145 and 146 are stored as P0 in per-alignment state machines 1209, 1211, and 1213 respectively.

Returning to FIG. 11A at block 1107, it is determined if X is equal to N−1. If X is not equal to N−1, then at block 1109 X is incremented. From block 1109, control flows back to block 1103. If at block 1107 it is determined that X does equal N−1, then at block 1111 X is reset. At block 1113, another signal bit is received from the register 615. From block 1113 control flows to both blocks 1115 and 1117. At block 1115 it is determined if the received bit is the next expected F-bit for a per-alignment state machine X in concurrence with verification of M-bit patterns for a per-alignment state machine (X+98) MOD 147 at block 1117. In other words, the search for valid F-bit and M-bit patterns are performed concurrently. If the received bit is the next expected F-bit for the per-alignment state machine X, then at block 1123 it is determined if X equals N−1. If at block 1115 it is determined that the received bit is not the next expected F-bit for the per-alignment state machine X, then at block 1119 the sync hunt state machine for the per-alignment state machine X is set to indicate a state of fail. For example, if per-alignment state machine is expecting a 1 but receives a 0, then synchronization represented by that state machine cannot be correct. From blocks 1119 and 1117 control flows to block 1123. If it is determined at block 1123 that X does not equal N−1, then at block 1121 X is incremented. From block 1121 control flows to block 1113. If at block 1123 it is determined that X equals N−1, then it is determined if all the per-alignment state machines have failed or a time out has occurred at block 1125. If all of the per-alignment state machines have failed or a time out has occurred, then at block 1127 DS2 sync hunting is restarted. In an alternative embodiment, a timeout forces the sync hunt logic to select one of the remaining per-alignment state machines as the winner. If it is determined at block 1125 that all the state machines have not failed or a time out has not occurred, then at block 1129 it is determined if only one per-alignment state machine has not failed. If it is determined at block 1129 that more than one per-alignment state machine remains valid, then control flows to block 1111. If only one per-alignment state machine has not failed, then it is determined at block 1130 if the per-alignment state machine indicates a state "MAINTAIN_01". If the valid per-alignment state machine does not indicate the state "MAINTAIN_01", then control flows to block 1111. If the valid per-alignment state machine indicates the state "MAINTAIN_01", then the DS2 stream has been synchronized and DS2 deframing begins at block 1131.

FIG. 11B is a flow chart for performing block 1117 of FIG. 11A according to one embodiment of the invention. At block 1133 it is determined if the bit received at block 1113 is bit 0 of a subframe for a per-alignment state machine (X+98) mod 147 using the counter bits and stored F-bits from the register 617. If the received bit is not bit 0, then control flows to block 1123 of FIG. 11A. If it is determined at block 1133 that the received bit is bit 0 of a subframe for this per-alignment state machine, then at block 1135 it is determined if the state indicated by the sync hunt state machine for this per-alignment state machine (bits from the register 619) is "MAINTAIN_01". Table 4 describes a DS-2 per-alignment state machine.

TABLE 4

State Encoding for DS2 Sync Hunt

| State Bits (most significant bit to least significant bit) | State Machine Action |
|---|---|
| 0 - H1 H0 - F0 | Shift0<br>Shift in potential first F-bit into F0 |
| 0 - H0 - F0 | Hunt0, Hunt1<br>+ Freeze {F0}, use to check incoming potential F-bits<br>+ Shift incoming potential M-bits into {H0}<br>shift register. If {H0, incoming bit} = 01,<br>then go to Maintain_01 state and set {S2, S1, S0} = S01, else if 8 subframes have passed, then fail, else continue Hunt0, Hunt1 state |
| 1 S2 S1 S0 F0 | Maintain_01<br>+ continue to use {F0} to check incoming potential F-bits<br>+ {S2, S1, S0} forms a state machine to check incoming potential M-bits. Check that incoming potential framing bits match pattern 011X, where X can be either 0 or 1. |
| 1 1 1 1 | Fail |

If the sync hunt state machine of the per-alignment state machine indicates "MAINTAIN_01", then at block 1137 it is determined if the received bit is the correct bit in accordance with a state indicated by the sync hunt state machine as shown in table 5.

TABLE 5

States Represented by Synch Hunt State Machine

| s2 s1 s0 | state name |
|---|---|
| 0 | S0 |
| 1 | S01 |
| 2 | S011 |

TABLE 5-continued

States Represented by Synch Hunt State Machine

| s2 s1 s0 | state name |
|---|---|
| 3 | X |
| 7 | FAIL |

As with the DS3 sync hunt state machine, each state represents a transition state. The state S0 means the sync hunt logic is looking for a bit 0. The state S01 means the sync hunt state machine has seen a previous bit 0 and is looking for a bit 1. The state S011 means the sync hunt logic has seen a bit 1 as the previous bit and is looking for a 1. The state X represents acceptance of any bit since the fourth M framing bit can be either a 0 or 1.

If the received bit is not the correct bit, then at block 1139 the sync hunt state machine is set to indicate a state of fail. From block 1139 control flows back to block 1123 of FIG. 11A. If at block 1137 it is determined that the received bit is correct, then at block 1141 the sync hunt state machine of this per-alignment state machine is updated. For example, the sync hunt state machine indicated the state S0 and the received signal bit is a 1, then state is updated to S01. From block 1141, control flows back to block 1123 of FIG. 11A. If at block 1135 it is determined that the sync hunt state machine does not indicate a state of "MAINTAIN_01", then at block 1143 it is determined if a framing M-bit stored in the sync hunt state machine and the received bit form a bit pattern "01". If these bits form this bit pattern, then at block 1145 the sync hunt state machine is set to indicate a maintenance state or "MAINTAIN_01". From block 1145, control flows back to block 1123 of FIG. 11A. If it is determined at block 1143 that the stored M-bit and the received bit do not form the pattern "010", then at block 1147 the received bit is shifted into the sync hunt state machine as the M-bit (110). At block 1149 it is determined if seven subframes have passed based on the counter and global state bits from the register 617 of FIG. 5. If seven frames have not passed for this per-alignment state machine, then control flows to block 1123 of FIG. 11A. If seven subframes have passed for this per-alignment state machine, then at block 1151 the sync hunt state machine for this per-alignment state machine is set to indicate a state of fail. From block 1151, control flows to block 1123 of FIG. 11A.

Similar to the DS3 deframer, a master state machine controls the DS2 sync hunt logic. The states of the DS2 master state machine are shown in Table 6 below.

TABLE 6

DS2 Master States

| SH2_IDLE | channel is idle |
| SH2_SHIFT_SF | first subchannel of hunt - used to reset states |
| SH2_HUNT | hunting |
| SH2_WAIT_WINNER | found a single winner, but now wait for winner again; the purpose is to simplify the counter logic in the DS2 deframers |
| SH2_RUN_FIRST | first bit of deframing, used to send signal downstream |
| SH2_RUN | steady state of run, continues to monitor framing |
| SH2_RPT_FAIL | failed to find any good frame alignment or failed to find a single winner after a timeout |

FIG. 13 is a diagram illustrating organization of the per-alignment state machines in the sync hunt per-alignment memory 621 of FIG. 6 according to one embodiment of the invention. In FIG. 13, the per-alignment state machines are arranged as three columns of 49 per-alignment state machines. This organization of the per-alignment state machines allows the sync hunt logic to accomplish 2 tasks concurrently: both the task of verifying subframe alignment with F-bit patterns for a per-alignment state machine X and the task of performing the sync hunt for a per-alignment state machine (X+98) MOD 147. Each per-alignment state machine is 5 bits wide. In another embodiment of the invention, the per-alignment state machines are wider.

The alignment signal for the DS1 superframe format is formed by interleaving framing and superframing bits. The first bit of each DS1 frame is a bit for the alignment signal. The interleaved framing and superframing bits form the pattern "100011011100". The DS1 superframe alignment bit patterns are used to aid in the understanding of the invention and not as limitations upon the invention.

Figure 14A:
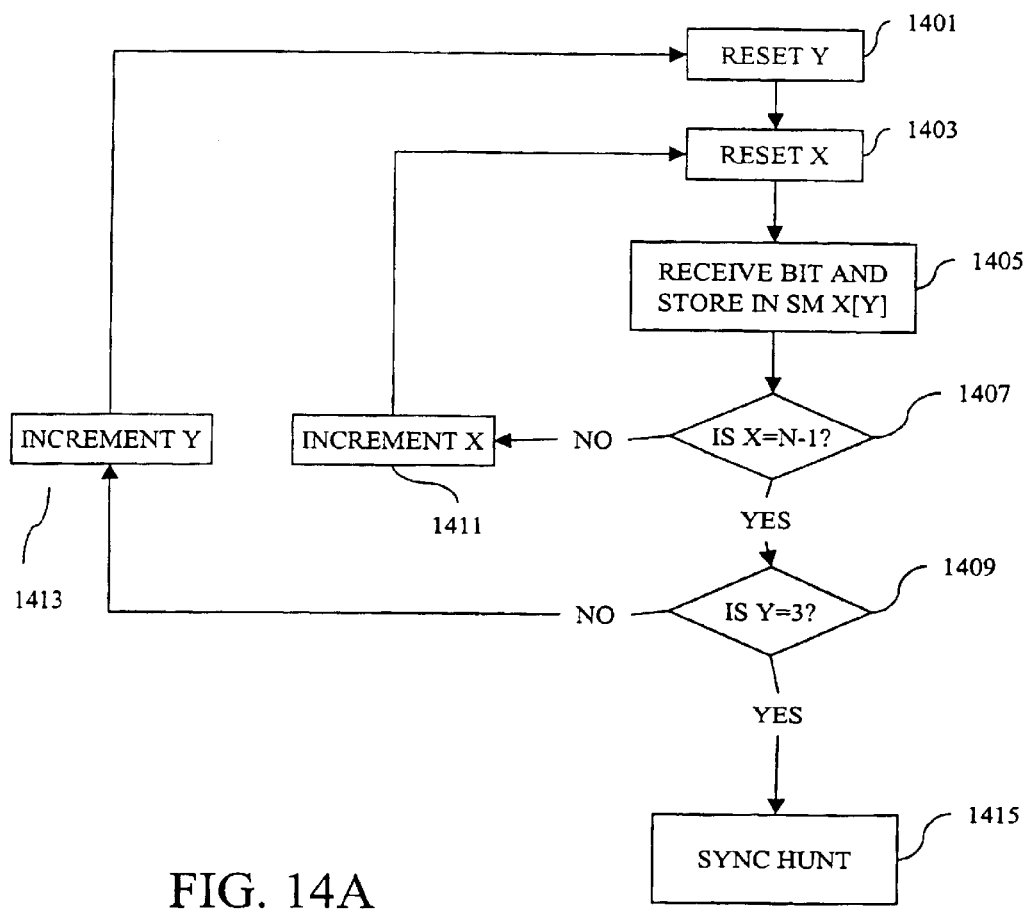
FIG. 14A is the flow chart for initializing the per-alignment state machines for DS1 super frame sync hunting according to one embodiment of the invention.
Figure 14B:
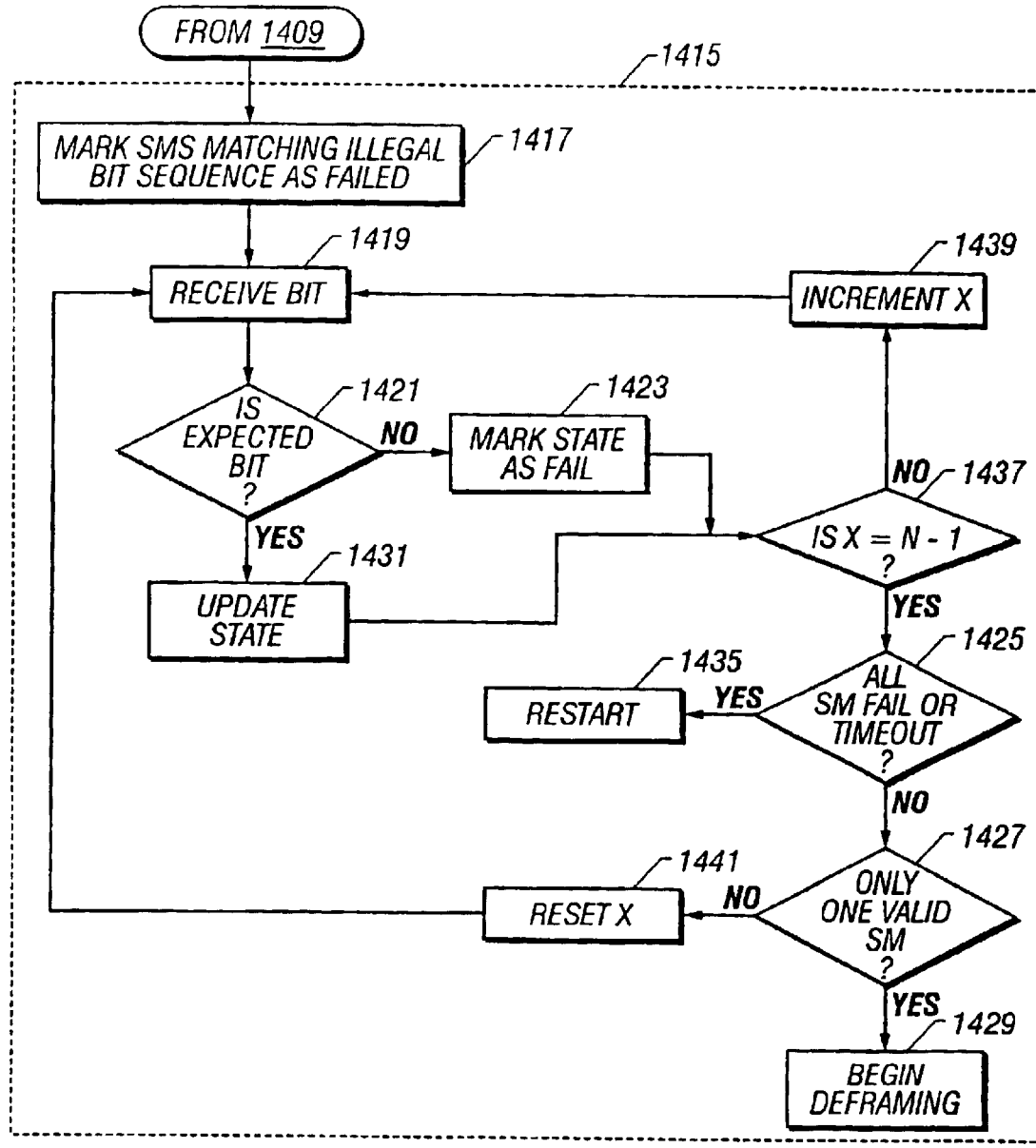
FIG. 14B is a flow chart for performing block 1415 of FIG. 14A according to one embodiment of the invention.

FIGS. 14A–14B are flow charts for DS1 super frame sync hunting performed by the DS1 sync hunt logic 727 of FIG. 7 according to one embodiment of the invention. FIG. 14A is the flow chart for initializing the per-alignment state machines for DS1 super frame sync hunting according to one embodiment of the invention. As with the DS3 and DS2 sync hunting, the following logic is not performed on a signal bit from the register 713 if a corresponding validity from the register 711 indicates the signal bit as invalid. At block 1401, a value Y is reset. The value Y is a counter variable for the number of bits seen for each per-alignment state machine. At block 1403, a value X is reset. At block 1405 a signal bit is received from the register 713 and stored in a per-alignment state machine X [Y]. At block 1407 it is determined if X=N−1. If X does not equal N−1, then at block 1411 X is incremented. From block 1411, control flows back to block 1405. If it is determined at block 1407 that X=N−1, then at block 1409 it is determined if Y equals three. If Y is not equal to three, then at block 1413 Y is incremented. From block 1413 control flows to block 1403. If Y does equal three, then framing verification is performed at block 1415.

Figure 15:
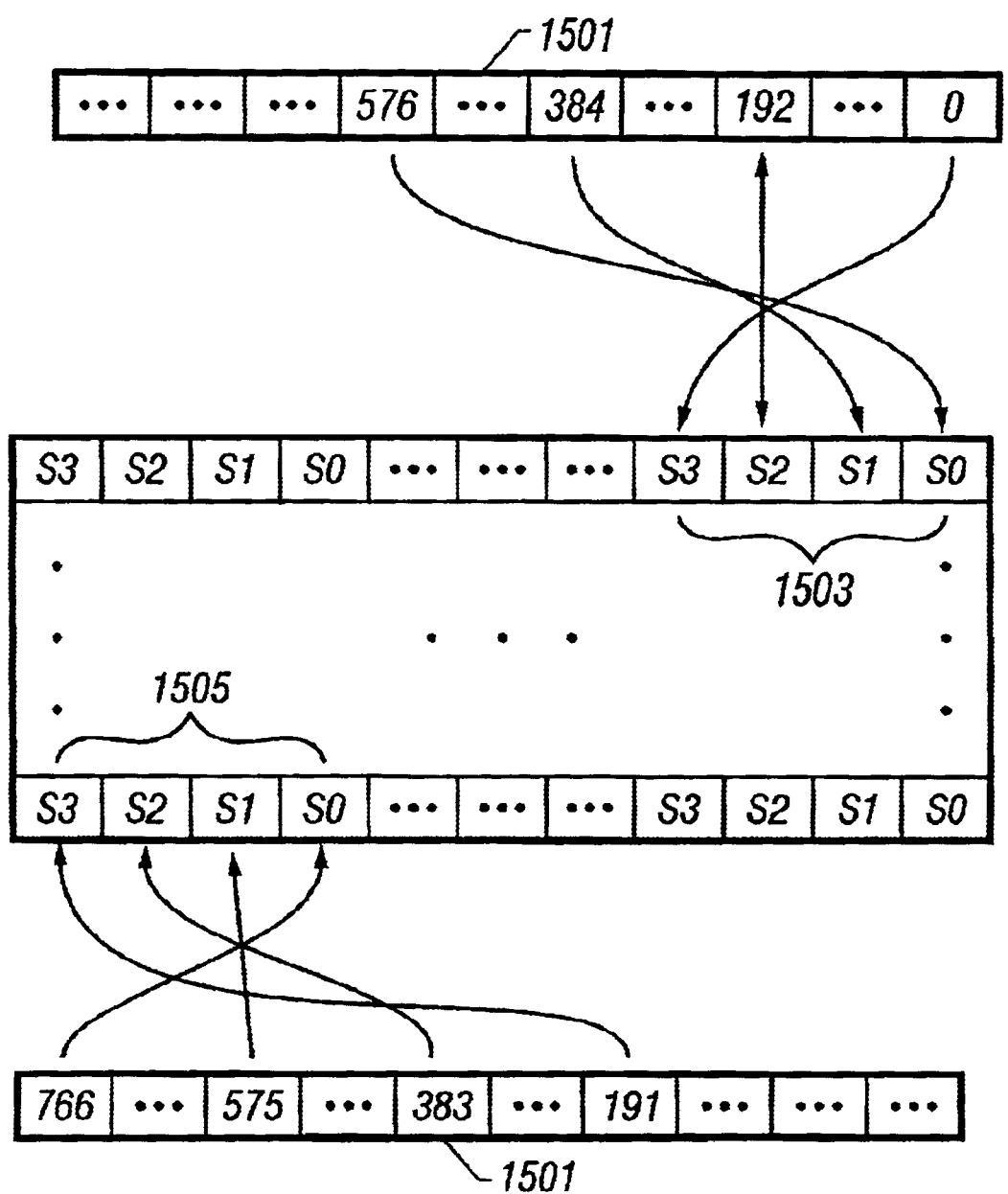
FIG. 15 is an exemplary illustration of FIG. 14A according to one embodiment of the invention.

FIG. 15 is an exemplary illustration of storing bits in DS1 per-alignment state machines according to one embodiment of the invention. In this example of DS1 super frame sync hunting, 192 per-alignment state machines are maintained. If a bit 0 is the first bit of a bit stream, then bit x (x being any number from 0 to 766) will be stored in a per-alignment state machine x MOD 192 in position x DIV 192. In FIG. 15, a bit stream 1501 is received. Bits 0, 192, 384, and 576 are stored as S3, S2, S1 and S0 respectively of the per-alignment state machine 1503 (per-alignment state machine 0). Bits 191, 383, 575, and 766 are stored as S3, S2, S1 and S0 respectively of the per-alignment state machine 1505 (per-alignment state machine 191). All of the first 767 bits are stored in the 192 per-alignment state machines.

FIG. 14B is a flow chart for performing block 1415 of FIG. 14A according to one embodiment of the invention. At block 1417 each per-alignment state machine with a bit sequence matching an illegal bit sequence is updated to indicate a state of fail. Table 7 shows the illegal 4 bit sequences.

TABLE 7

Illegal bit sequences for DS1 super frame
Illegal 4 bit sequences 0000
0101
1010
1111

The bit sequences identified in table 7 do not occur in the framing bit stream for DS1 super frame formatting.

At block 1419 a signal bit is received from the register 713. At block 1421 it is determined if the received bit is the expected bit in accordance with the indicated state of the per-alignment state machine X as shown in Table 8 below.

TABLE 8

| States Represented by Synch Hunt State Machine | |
|---|---|
| State Name | state machine encoding |
| S1 | 0x1 |
| S2 | 0x2 |
| S3 | 0x3 |
| S4 | 0x4 |
| S6 | 0x6 |
| S7 | 0x7 |
| S8 | 0x8 |
| S9 | 0x9 |
| Sb | 0xb |
| Sc | 0xc |
| Sd | 0xd |
| Se | 0xe |
| FAIL | 0xf |
| BAD_0 | 0x0 |
| BAD_1 | 0x5 |
| BAD_2 | 0xa |

These states are based on the super frame framing bit stream 100011011100.

If the received bit is not the expected bit, then at block 1423 the per-alignment alignment state machine is updated to indicate a state of fail. If the received bit is the expected bit, then at block 1431 the per-alignment state machine is updated. Control flows, from block 1423 and block 1431 to block 1437. At block 1437 it is determined if X=N−1. If X does not equal N−1, then at block 1439 X incremented. Control flows from 1439 to block 1419. If at block 1437 it is determined that X equals N−1, then at block 1425 it is determined if all per-alignment state machines have failed or a timeout has occurred. If all state machines have not failed and a timeout has not occurred, than at block 1427 it is determined if only one state machine remains valid. If, at block 1425, it is determined that all of the per-alignment state machines have failed, then at block 1435 DS1 super frame sync hunting is restarted. If it is determined at block 1427 that only one state machine remains valid, then synchronization has been found for the DS1 signal and at block 1429 DS1 super frame deframing begins. If it is determined at block 1427 that more than one per-alignment state machine is valid, then at block 1441 X is reset and control flows back to 1419.

The alignment signal for the DS1 extended superframe format comprises framing bits (F-bits) positioned at the beginning of every block that is a multiple of four (i.e., the first bit of blocks 4, 8, 12, 16, etc). The F-bits form the pattern "001011" over 24 frames. The pattern is repeated every 24 frames. The DS1 extended superframe alignment bit patterns are meant to aid in the understanding of the invention and not as limitations upon the invention.

Figure 16A:
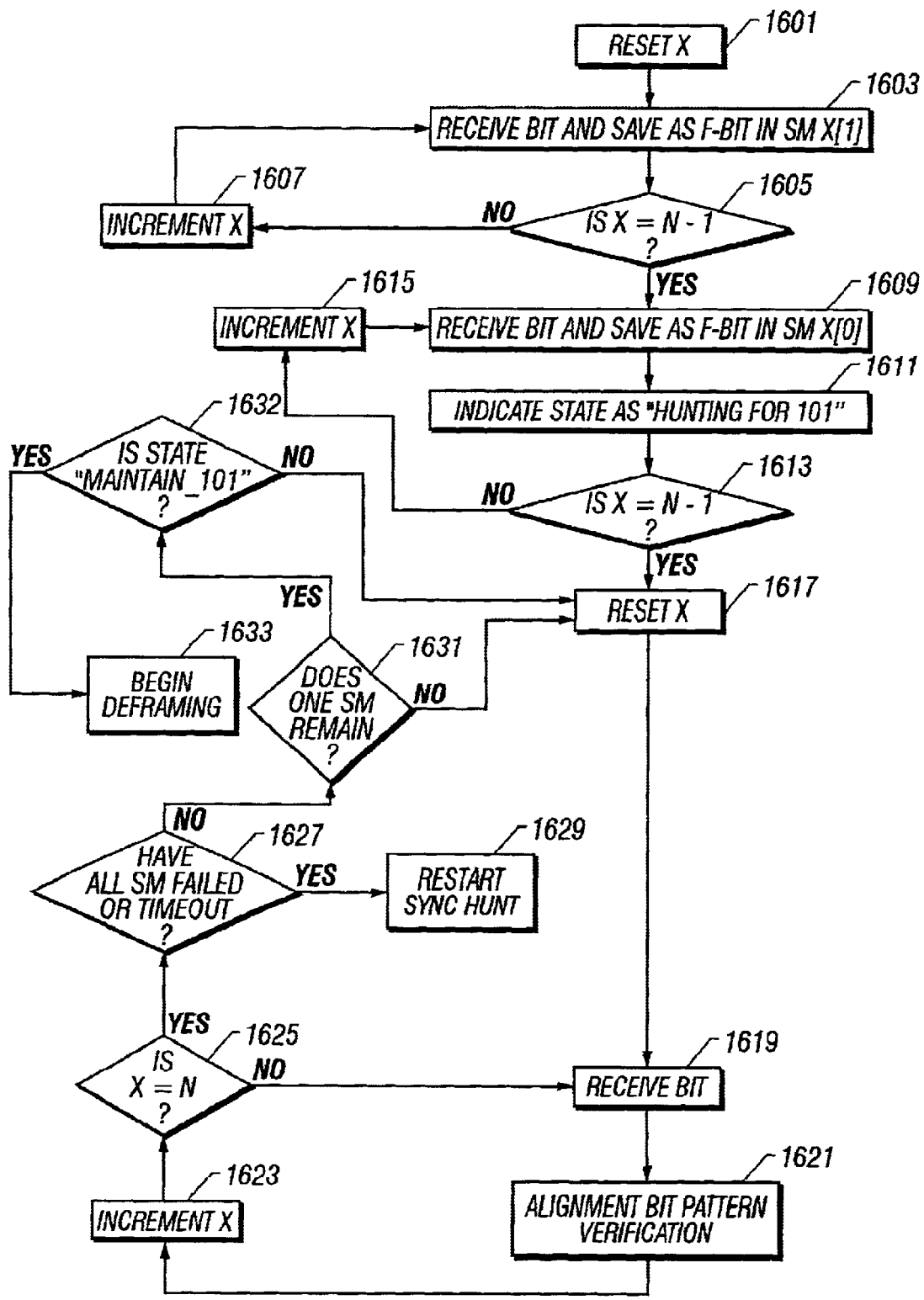
FIG. 16A is a flow chart for DS1 extended super frame sync hunting according to one embodiment of the invention.
Figure 16B:
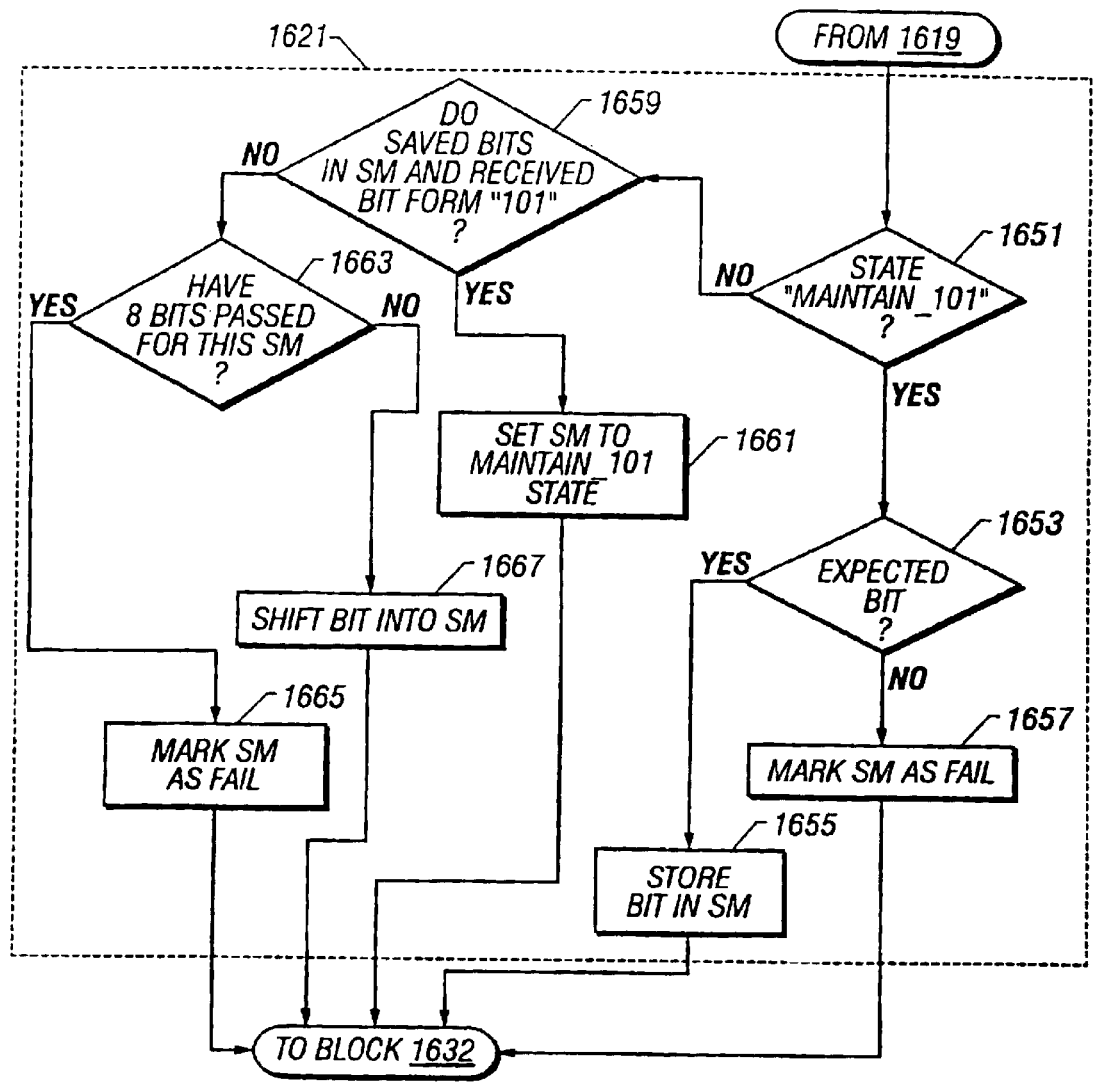
FIG. 16B is a flow chart for performing block 1621 of FIG. 16A according one embodiment of the invention.

FIGS. 16A–16B are flow charts for sync hunting a DS1 extended super frame signal performed by the DS1 sync hunt logic 727 of FIG. 7 according to one embodiment of the invention. FIG. 16A is a flow chart for DS1 extended super frame sync hunting according to one embodiment of the invention. At block 1601 a value X is reset. At block 1603 a signal bit is received from the register 713 and shifted into a per-alignment state machine X. Table 9 describes a DS1 Extended Superframe per-alignment state machine.

TABLE 9

State Encoding for DS1 Extended Super Frame Sync Hunt

| State Bits (most significant bit to least significant bit) | State Machine Action |
|---|---|
| 0 - H1 H0 | Shift0<br>Shift in potential first framing but into H0 |
| 0 - H1 H0 | Shift1<br>Shift H0 to H1 and shift potential second bit into H0 |
| 0 - H1 H0 | Hunt0, Hunt1 +<br>Shift incoming potential framing bits into {H0} shift register.<br>If {H1, H0, incoming bit} = 101, then go to Maintain_101 state and set {S2, S1, S0} = S00101, else if 8 bits have passed for this per-alignment state machine, then fail, else continue Hunt0, Hunt1 state |
| 1 S2 S1 S0 | Maintain_01 +<br>{S2, S1, S0} forms a state machine to check incoming potential framing bits. Use {S2, S1, S0} to check that incoming potential framing bits match expected pattern. |
| 1 1 1 1 | Fail |

At block 1605, it is determined if X=N-1. If X is not equal to N-1, then at block 1607 X is incremented. From block 1607, control flows to block 1603. If it is determined at block 1605 that X=N-1, then at block 1609 a bit is received and stored as a second F-bit in the per-alignment state machine X[O]. An illustration of storing F-bits in the per-alignment state machines is described with reference to FIG. 17.

Figure 17:
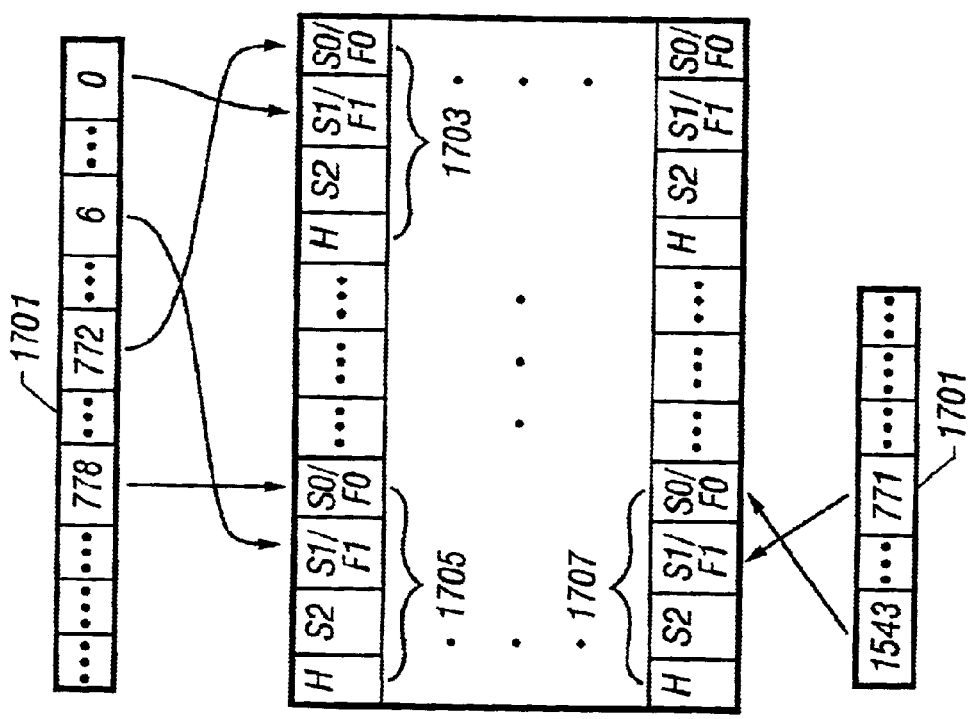
FIG. 17 is an exemplary illustration for storing F-bits in per-alignment state machines for sync hunting DS1 extended superframe according to one embodiment of the invention.

FIG. 17 is an exemplary illustration for storing F-bits in per-alignment state machines for sync hunting DS1 extended superframe according to one embodiment of the invention. In this example 772 per-alignment state machines are maintained, but only four are shown. In FIG. 17, a bit stream 1701 is received. Bits 0 and 772 are stored as F1 and F0 respectively of a per-alignment state machine 1703. Bits 6 and 778 are stored as F1 and F0 respectively of a per-alignment state machine 1705. Bits 771 and 1543 are stored as F1 and F0 respectively of a per-alignment state machine 1707. Every bit of the first 1544 valid bits in the bit stream 1701 will be stored in the per-alignment state machines. We will return to describing FIG. 16A.

At block 1611, the per-alignment state machine is set to indicate "HUNTING_101". At block 1613 it is determined if X=N-1. If X is not equal to N-1, then at block 1615, X is incremented. Control flows back to block 1609 from block 1615. If it is determined at block 1613 that X is equal to N-1, then at block 1617 X is reset. At block 1619 another signal bit is received from the register 713. At block 1621 frame bit verification is performed. At block 1625 it is determined if X=N-1. If X is not equal to N-1, then at block 1623 X is incremented. From block 1623 control flows to block 1619. If X is equal to N-1, then at block 1627 it is determined if all per-alignment state machines have failed or timeout has occurred. In an alternative embodiment of the invention, a timeout forces the sync hunt logic to select one of the valid per-alignment state machines as a winner. If all state machines have failed or timeout has occurred, then at block 1629 DS1 sync hunting is restarted. If it is determined at block 1627 that all per-alignment state machines have not failed or a timeout has not occurred, then at block 1631 it is determined if only one per-alignment state machine remains valid. If more than one per-alignment state machine remains valid, then control flows to block 1617. If only one per-alignment state machine remains valid, then it is determined at block 1632 if the valid per-alignment state machine indicates a state "MAINTAIN_101". If the valid per-alignment state machines does not indicate this state, then control flows to block 1617. If it is determined at block 1632 that the valid per-alignment state machine indicates the state "MAINTAIN_101", then synchronization has been found for the DS1 extended superframe signal and at block 1633 DS1 extended super frame deframing begins.

FIG. 16B is a flow chart for performing block 1621 of FIG. 16A according one embodiment of the invention. At block 1651 it is determined if the state of the per-alignment state machine X is set to "MAINTAIN_101". If the state of the per-alignment state machine X is set to the state "MAINTAIN 101", then at block 1633 it is determined if the received bit is the correct bit in accordance with the state indicated by the per-alignment state machine X. The states of the extended super frame DS1 states are shown in Table 10.

TABLE 10

States Represented by Synch Hunt State Machine

| s2 s1 s0 | state name |
|---|---|
| 0 | S0 |
| 1 | S00 |
| 2 | S001 |
| 3 | S0010 |
| 4 | S00101 |
| 5 | S001011 |
| 7 | FAIL |

Each state represents a transition state for DS1 extended super frame sync hunting. The state S0 means the sync hunt logic is looking for the bit 0. The state S00 means the sync hunt state machine has stored a previous bit 0 and is looking for a bit 0. The state S001 means the sync hunt logic saw a 0 as the previous bit and is looking for a 1. The state S0010 indicates that the sync hunt state machine has stored a previous bit 1 and is looking for a bit 0. The state S00101 means the sync hunt state machine has stored a previous bit 0 and is looking for a bit 1. The state S001011 indicates that the sync hunt state machine has stored a previous bit 1 and is looking for a bit 1. If the received bit is the correct bit, then the bit is shifted into the sync hunt state machine at block 1655. Control flows from block 1655 to block 1623 of FIG. 16A. If the received bit is not the correct bit in accordance with the state indicated by the sync hunt state machine of the per-alignment state machine X, then the per-alignment state machine X is set to indicate a state of fail at block 1657.

Control flows from block 1657 to block 1623 of FIG. 16A. If it is determined at block 1651 that the state of the per-alignment state machine X does not indicate "MAINTAIN_101", then at block 1659 it is determined if the framing bits stored in the per-alignment state machine X and the received bit form the bit sequence "101". If these bits form the bit sequence "101", then at block 1661 the state of the per-alignment state machine X is set to indicate a maintenance state of "MAINTAIN_101". Control flows from block 1661 to block 1623 of FIG. 16A. If it is determined at block 1659 that the stored framing bits and the received bit do not form the bit pattern "101", then at block 1663 it is determined if eight bits have been seen for the per-alignment state machine X. If eight bits have been seen for this per-alignment state machine, then at block 1665 the per-alignment state machine X is set to a state of fail. Control flows from block 1665 to block 1623 of FIG. 16A. If it is determined at block 1663 that eight bits have not been seen for the per-alignment state machine X, then at block 1667 the received bit is shifted into the per-alignment state machine. From block 1667 control flows to block 1623 of FIG. 16A.

A master state machine regardless of extended super frame or super frame formatting controls DS1 sync hunting. The states of the master state machine are shown in table 11.

TABLE 11

DS1 Master States

| | |
|---|---|
| SH1_IDLE | channel is idle |
| SH1_HUNT_FIRST | first subchannel of hunt - used to reset states; when DS1 superframe this state lasts for 772 bits so that each of the 193 states can shift in 4 frames per superframe |
| SH1_HUNT | hunting |
| SH1_FIND_WINNER | found a single winner, but now wait for winner again; the purpose is to simplify the counter logic in the DS1 deframers |
| SH1_RUN_FIRST | first bit of deframing, used to send signal downstream |
| SH1_RUN | steady state of run, continues to monitor framing |

Figure 18:
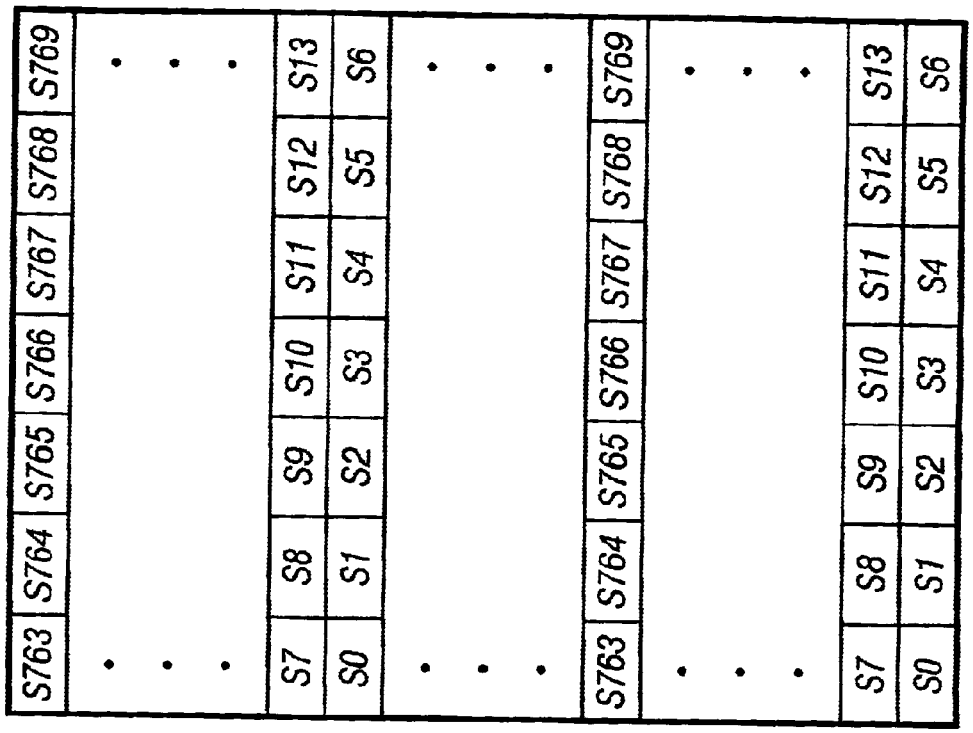
FIG. 18 is a diagram illustrating the organization of per-alignment state machines in the memory unit 321 of FIG. 3 according to one embodiment of the invention.

FIG. 18 is a diagram illustrating the organization of per-alignment state machines in the memory unit 321 of FIG. 3 according to one embodiment of the invention. Although the sync hunt logic 727 of FIG. 7 only uses 193 per-alignment state machines for DS1 super frame sync hunting, the memory unit 321 of FIG. 3 is of a size sufficient to store 770 of the 772 per-alignment state machines for DS1 extended super frame sync hunting. In FIG. 18, the DS1 per-alignment state machines are organized as 18480 rows of 7 per-alignment state machines. (18480 is the product of 6 DS3 pairs*28 DS1 subchannels*110 rows of 7 per-alignment state machines). Each of the per-alignment state machines are 4 bits wide. The two per-alignment state machines that are not stored in the memory unit 321 of FIG. 3 are located on chip with the DS1 deframing unit 209 of FIG. 2. Since the external memory unit in this example is 28 bits wide, a total of 110+2/7 memory lines are needed for sync hunting DS1 extended super frames. Storing the 2/7 memory line in on-chip memory makes the memory organization and bandwidth supplied by the memory controller uniform. In another embodiment of the invention, the memory unit is expanded to accommodate the 2/7 memory line. In such an embodiment, the depth of the read/write FIFOs is increased to accommodate a periodic dip in memory bandwidth supplied by the memory controller.

Figure 19:
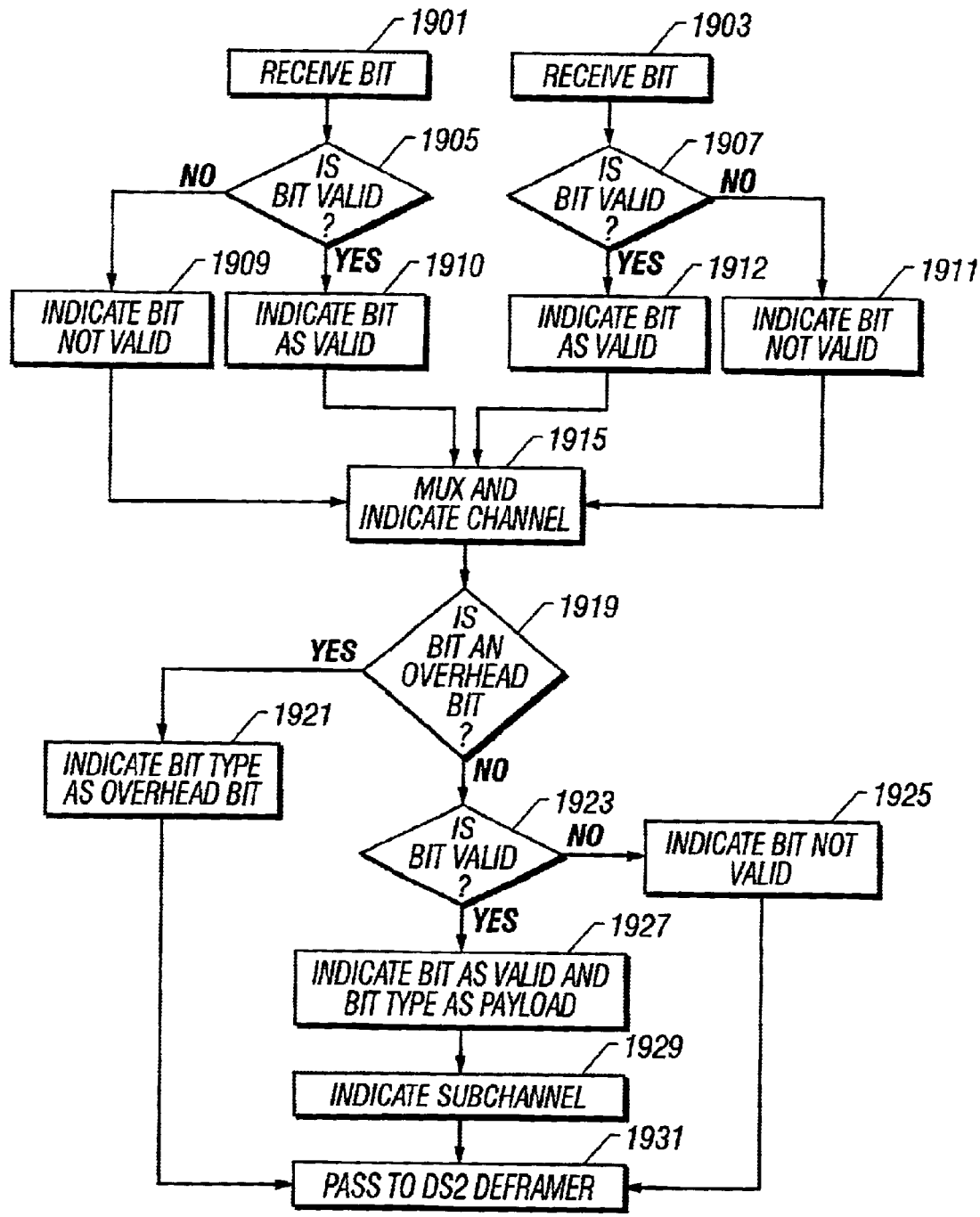
FIG. 19 is a flowchart for DS3 deframing performed by the DS3 deframing logic 525 of FIG. 5 according to one embodiment of the invention.

FIG. 19 is a flowchart for DS3 deframing performed by a DS3 deframing logic according to one embodiment of the invention. Reference is made to FIG. 5 to help illustrate DS3 deframing. A bit stream is received at block 1901 and a bit stream is received at block 1903. At block 1905 it is determined if each bit of the bit stream received at block 1901 is valid (i.e. determine if receiving buffers are empty). At block 1907 it is determined if each of the signal bits stored in the register 519 received at block 1903 is valid (i.e. determine if receiving buffers are empty). At block 1909, a bit is generated to indicate invalidity for any of the bits of the bit stream if determined not to be valid at block 1905. Similarly, at block 1911, a bit is generated to indicate invalidity for any of the bits of the bit stream received at block 1903 if determined not to be valid at block 1907. For each of the bits of the bit stream received at block 1901 determined to be valid at block 1905, a bit is generated to indicate validity at block 1910. Likewise, for each of the bits of the bit stream received at block 1903 determined to be valid at block 1907, a bit is generated to indicate validity at block 1912. Control flows from blocks 1909–1912 to block 1915. At block 1915, the bit streams and validity bits are multiplexed. In addition, at block 1915 a bit (channel bit) is generated for each bit during multiplexing to distinguish bit streams. At block 1919, for each bit of the original bit streams, it is determined if the bit is an overhead bit. For each bit determined to be an overhead bit, a bit is generated to identify the bit as a DS3 overhead bit at block 1921. At block 1931, bits are passed to a DS2 deframer. For each bit determined not to be an overhead bit at block 1919, it is determined if each bit is valid at block 1923. A bit is generated at block 1925 to indicate invalidity for each invalid bit. Control flows from block 1925 to block 1931. For each of the bits determined to be valid at block 1923, bits are generated to indicate validity and bit type as payload at block 1927. At block 1929, bits are generated to indicate a subchannel for each bit (i.e., indicate which DS2 signal the bit is from). From block 1929, control flows to block 1931.

Figure 20:
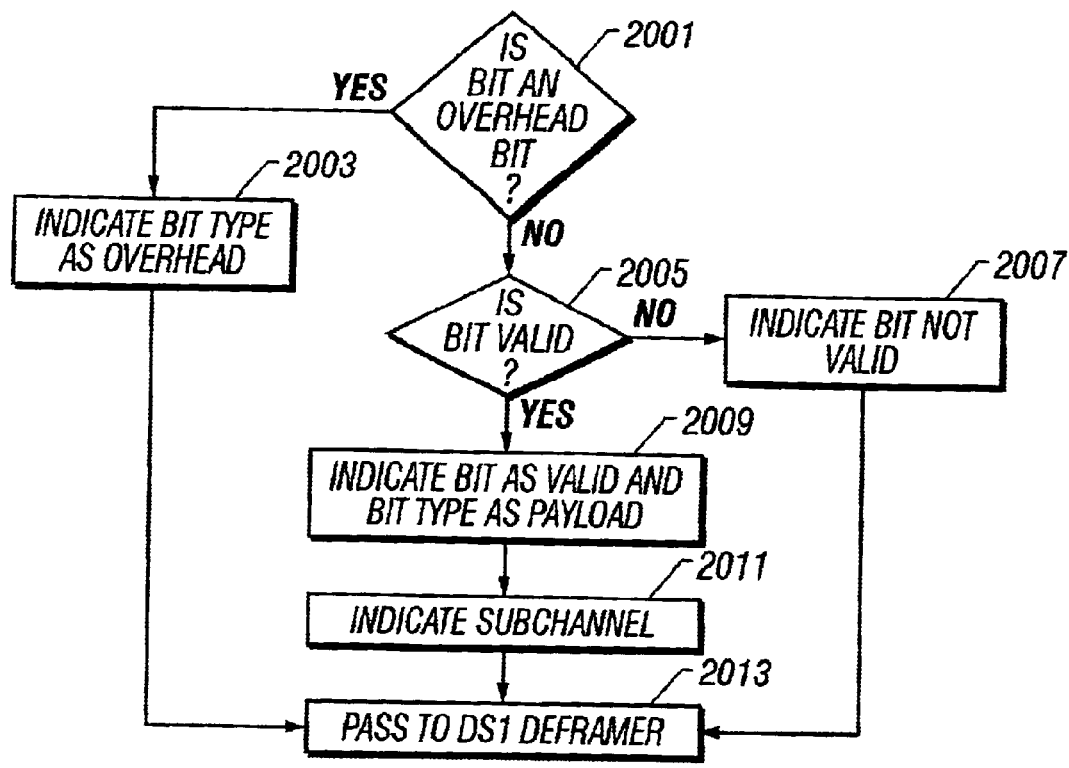
FIG. 20 is a flowchart for DS2 deframing performed by the DS2 deframing logic 625 of FIG. 6 according to one embodiment of the invention.

FIG. 20 is a flowchart for DS2 deframing performed by a DS2 deframing logic according to one embodiment of the invention. Reference is made to FIG. 6 to help illustrate. At block 2001, it is determined if a signal bit received from the register 615 of FIG. 6 is an overhead bit. If it is an overhead bit, then at block 2003 a bit is generated to indicate the bit is a DS2 overhead bit. At block 2013, the bit is passed to the DS1 deframer. If it is determined at block 2001 that the bit received from the DS3 deframer is not a DS2 overhead bit, then at block 2005 it is determined if the bit is valid. If the bit is not valid, then a bit is generated to indicate invalidity of the bit at block 2007. From block 2007, control flows to block 2013. If at block 2005 it is determined that the bit is valid, then at block 2009 bits are generated to indicate validity of the bit the type of the bit as payload. At block 2011, bits are generated to indicate a subchannel for the bit (i.e., indicate which DS1 signal the bit is from). Control flows from block 2011 to block 2013.

Figure 21:
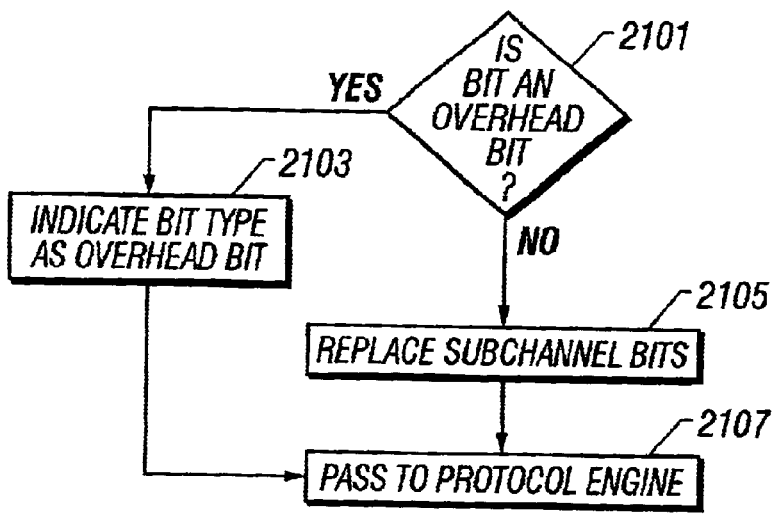
FIG. 21 is a flowchart for DS1 deframing performed by the DS1 deframing logic 725 of FIG. 7 according to one embodiment of the invention.

FIG. 21 is a flowchart for DS1 deframing performed by a DS1 deframing logic according to one embodiment of the invention. At block 2101 it is determined if a signal bit received from the register 713 of FIG. 7 is an overhead bit. If the bit is an overhead bit, then at block 2103 a bit is generated to identify the bit as a DS1 overhead bit. At block 2107 the bit and all stuffing bits for the bit are passed to the protocol engine. If at block 2101 it is determined that the bit is not an overhead bit, then at block 2105 the DS1 subchannel bits for the signal bit is replaced with a different DS1 subchannel bits. The initial DS1 subchannel bits indicated whether the DS1 bit belonged to a DS1 subchannel between 0 and 27, but the DS1 deframer 324 is processing 56 DS1 subchannels. The new DS1 subchannels bits indicate which of the 56 DS1 subchannels a given bit belongs. Control flows from block 2105 to block 2107.

As described above, each successive deframer tags the multiplexed bit stream with successively more information. For example, the DS3 deframer tags the bit stream with DS2 subchannel numbers and an indication of the DS3 channel (i.e., even or odd DS3 input). The DS2 deframer adds indicator bits indicating DS1 subchannels. The DS1 deframer extracts the Facility Data Link Channel and tags it, creating a new data link channel for every data channel. The DS3 deframer tags bits to distinguish overhead bits from information bits. A stuffing bit identifying a bit as a DS3 information bit is replaced by the DS2 deframer with a stuffing bit identifying the bit as a DS2 overhead bit or DS2 information bit. The same is done by the DS1 deframer.

Figure 22:
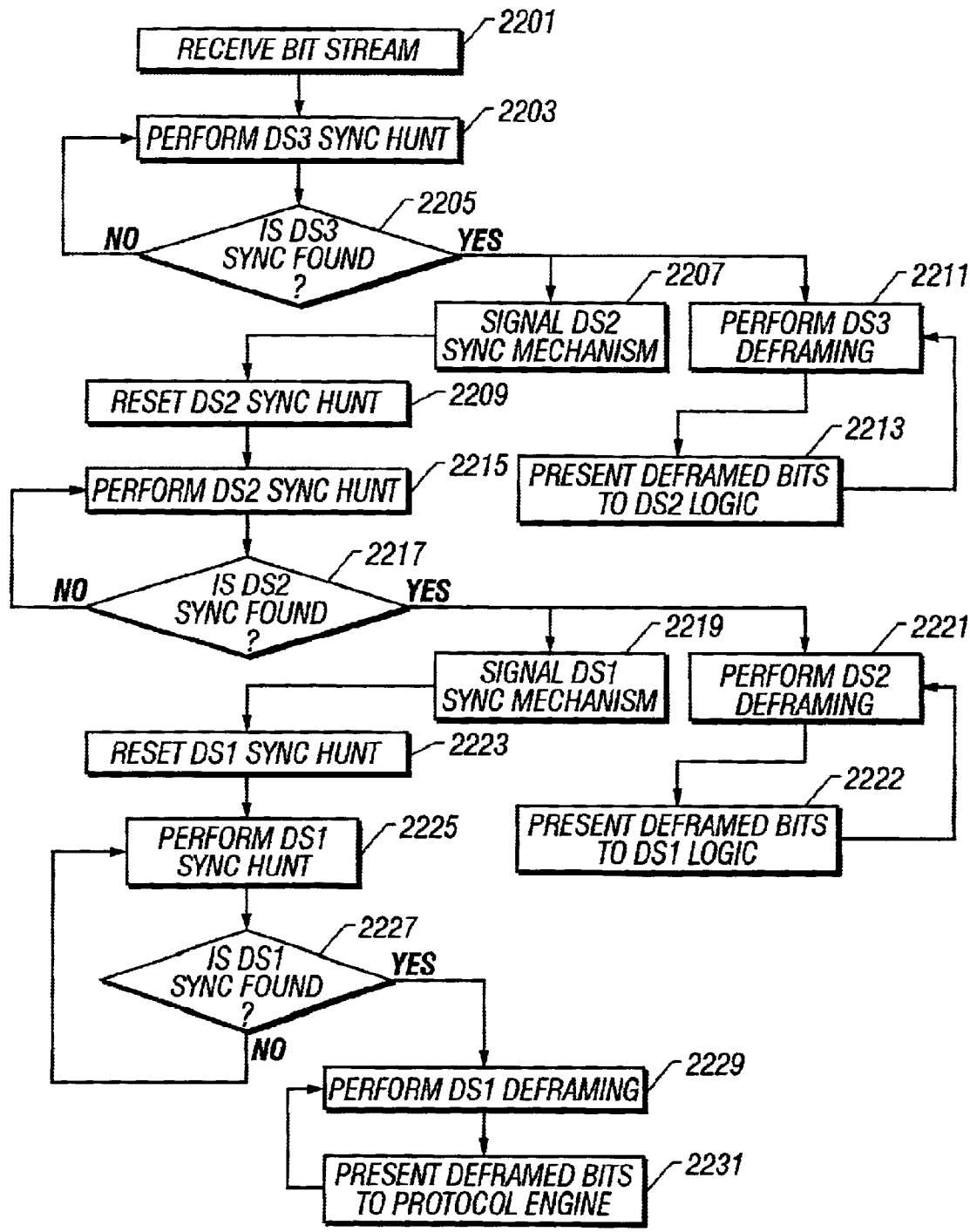
FIG. 22 is a flowchart for change of frame alignment feed forwarding according to one embodiment of the invention.

FIG. 22 is a flowchart for change of frame alignment feed forwarding according to one embodiment of the invention. In FIG. 22, a bit stream is received at block 2201. At block 2203, DS3 sync hunting is performed. At block 2205 it is determined if the DS3 bit stream has been synchronized. If the DS3 bit stream has not been synchronized, then control flows back to block 2203. If the DS3 bit stream has been synchronized, then at block 2207 the DS2 sync hunt mechanism is signaled by the DS3 sync hunt mechanism and DS3 deframing begins at block 2211. In response to the signal, the DS2 sync hunt is reset at block 2209 while the DS3 mechanism begins to present deframed bits to the DS2 logic at block 2213. Until the bit stream terminates, control loops back to block 2211 from block 2213. At block 2215, DS2 sync hunting is performed. From block 2215, control flows to block 2217 where it is determined if the DS2 sync has been found. If the sync has not been found, then control flows back to block 2215. If the DS2 sync has been found, then at block 2219 the DS1 sync hunt mechanism is signaled by the DS2 sync hunt mechanism and DS2 deframing begins at block 2221. In response to the signal, the DS1 sync hunt is reset at block 2223 while the DS2 mechanism begins to present deframed bits to the DS1 logic at block 2222. Control loops back from block 2222 to block 2221 until the bit stream terminates. At block 2225, DS1 sync hunting is performed. At block 2227 it is determined if the DS1 sync has been found. If the DS1 sync has not been found, then control flows back to block 2225. If the DS1 sync has been found, then at block 2229 DS1 deframing is performed. At block 2231, the deframed bits are presented to the protocol engine. Control loops back from block 2231 to block 2229 until the bit stream terminates.

Change of frame alignment feed forwarding increases the efficiency of deframing. As soon as the DS3 deframer 320 finds the DS3 alignment and begins deframing, the DS2 deframer 322 will begin sync hunting for DS2 alignment. The DS2 deframer will not look at every bit from the DS3 deframer, though. The DS3 deframing logic is stuffing overhead bits, thus enabling the DS2 deframer to ignore bits which are not part of the DS2 alignment signal. Likewise, as soon as the DS2 deframer 322 finds the DS2 alignment and begins deframing, the DS1 deframer 324 will begin sync hunting for DS1 alignment. The accelerated sync hunting enabled by change of frame alignment forwarding provides the time for sharing sync hunting memory.

The deframing logic described herein enables the production of network elements with a high density of deframers. The validity bits used for synchronizing bit streams reduces cost and complexity of a network element to process a large number of bit streams. The density or number of bit streams that can be processed is not hindered by the generation of individual clocks for each channel or subchannel. Typically, the number of clocks increases linearly with the number of subchannels to be processed. Using the deframing logic described herein, the clock speed increases with the density of bit streams, but deframing is performed in one clock domain.

The described sync logic sync hunts by searching approximately half of the subframes of each frame. Such a design enables sharing of memory to maintain state machines for multiple subchannels. Sharing memory reduces the cost and complexity to implement the deframers. Furthermore, less space is used for memory to maintain state machines for deframing.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described. Alternative embodiments can implement the loop controls of the sync hunt logics and deframing logics in a variety of ways. In addition, as previously described, deframers running at a fast clock speed can process bit streams transmitted at a slower clock rate. The increased deframer density leads to alternative embodiments with the per-alignment state machines for the DS2 and DS3 deframers stored in external memory. In another embodiment, a single external memory unit stores the per-alignment state machines for all deframers. In another embodiment of the invention, each deframing slice of a network element processes a single DS3 input within a single clock domain. In another embodiment of the invention, each deframing slice of a network element processes a single DS3 input within a single clock domain and shares a single memory unit to store states. In another embodiment of the invention, data formats may vary across channels or subchannels. For example, a deframing slice may receive a DS3 input and an E3 in put as long as the domain clock outruns the sum of the incoming signal rates. In another exemplary embodiment of the invention, a DS2 signal may include three E1 signals instead of four DS1 signals. The E1 and DS1 signals can be deframed in the same clock domain.

The method and apparatus of the invention can be practiced with modification and alteration within the spirit and scope of the appended claims. The description is thus to be regarded as illustrative instead of limiting on the invention.

We claim:

1. An apparatus comprising:
    a memory unit to store a set of per-alignment state machines;
    a memory controller coupled to the memory unit, the memory controller to access the set of per-alignment state machines;
    a first deframing slice coupled to the memory controller, the first deframing slice having
        a first set of buffers coupled to the memory controller, the first set of buffers to store a first set of states from a first subset of the set of per-alignment state machines, a first set of logic coupled to the first set of buffers, the first set of logic to sync hunt a first signal with the first set of states and to update the first set of states, a second set of buffers coupled to the first set of logic, the second set of buffers to store the updated first set of states, the updated first set of states to be written to the first subset of the set of per-alignment state machines; and a second deframing slice coupled to the memory controller, the second deframing slice having a third set of buffers coupled to the memory controller, the third set of buffers to store a second set of states from a second subset of the set of per-alignment state machines, a second set of logic coupled to the third set of buffers, the second set of logic to sync hunt a second signal with the second set of states and to update the second set of states, a fourth set of buffers coupled to the second set of logic, the fourth set of buffers to store the updated second set of states, the updated second set of states to be written to the second subset of the set of per-alignment state machines.

2. The apparatus of claim 1 wherein the first and second signal have different signal formatting.

3. The apparatus of claim 1 wherein the first deframing slice further comprises a third set of logic for a second signal format, the first set of logic being for a first signal format.

4. A network device comprising:

a first deframing slice having a first high bit rate signal format synchronization hunting logic and a first low bit rate signal format synchronization hunting logic;

a second deframing slice having a second high bit rate signal format synchronization hunting logic and a second low bit rate signal format synchronization hunting logic;

a memory to host a plurality of state machines;

a memory controller coupled with the first and second deframing slices and the memory, the memory controller to perform read and write operations between the low bit rate signal format synchronization hunting logics and the memory; and a set of one or more machine readable media coupled with the first and second deframing slices, the set of machine readable media having stored therein a set of instructions to cause the first low bit signal format synchronization hunting logic and the second low bit rate signal format synchronization hunting logic to simultaneously synchronization hunt low bit rate signals extracted from different high bit rate signals using the state machines stored in the memory.

5. The network device of claim 4 wherein the low bit rate signal format is DS-1.

6. The network device of claim 4 wherein the state machines are per-alignment state machines.

* * * * *